US008032631B2

(12) United States Patent
Iino et al.

(10) Patent No.: US 8,032,631 B2
(45) Date of Patent: Oct. 4, 2011

(54) INFORMATION PROVIDING APPARATUS, INFORMATION PROVIDING METHOD, AND PROGRAM

(75) Inventors: Yoko Iino, Kanagawa (JP); Masayuki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1686 days.

(21) Appl. No.: 10/653,094

(22) Filed: Sep. 3, 2003

(65) Prior Publication Data

US 2004/0117228 A1 Jun. 17, 2004

(30) Foreign Application Priority Data

Sep. 5, 2002 (JP) ................................. 2002-259639

(51) Int. Cl.
*G06F 15/173* (2006.01)
(52) U.S. Cl. ...................................................... 709/225
(58) Field of Classification Search ................... 709/225
See application file for complete search history.

(56) References Cited

U.S. PATENT DOCUMENTS

| 6,889,213 B1 * | 5/2005 | Douvikas et al. ................ 705/67 |
| 2005/0182767 A1 * | 8/2005 | Shoemaker et al. ............ 707/10 |
| 2008/0184136 A1 * | 7/2008 | Malik ........................... 715/758 |

FOREIGN PATENT DOCUMENTS

| JP | 2002-49784 | 2/2002 |
| WO | WO 00/19326 | 4/2000 |

* cited by examiner

*Primary Examiner* — John Follansbee
*Assistant Examiner* — Alan Chou
(74) *Attorney, Agent, or Firm* — Oblon, Spivak, McClelland, Maier & Neustadt, L.L.P.

(57) ABSTRACT

Terminals are connected to an IM server and a registration Web server through a network. The terminals allow an information storage device to store personal information through the registration Web server. Also, the IM server allows the information storage device to store buddy lists of the terminals, the buddy lists showing relationship among the terminals. When one of the terminals requests obtaining personal information of the user of another terminal, the IM server determines the disclosure level of the requesting terminal based on the buddy list, selects items to be provided from personal information based on the disclosure level, and transmits the selected items to the terminal which has requested the personal information. The present invention can be applied to an IM system.

10 Claims, 25 Drawing Sheets

FIG. 3

| TERMINAL 15a | | |
|---|---|---|
| BUDDY ID | Subscription | Ask |
| terminal15b@imserver | None | - |
| terminal15c@imserver | None | Subscribe |
| terminal15d@imserver | To | - |
| terminal15e@imserver | From | - |
| terminal15f@imserver | From | Subscribe |
| terminal15g@imserver | Both | - |

FIG. 5

| TERMINAL 15a | | |
|---|---|---|
| BUDDY ID | Subscription | Ask |
| terminal15b@imserver | None | Subscribe |

61 — BUDDY ID row; 62 — Subscription; 63 — Ask; 60 — table

FIG. 6

| TERMINAL 15a | | |
|---|---|---|
| BUDDY ID | Subscription | Ask |
| terminal15b@imserver | To | — |

FIG. 7

| TERMINAL 15b | | |
|---|---|---|
| BUDDY ID | Subscription | Ask |
| terminal15a@imserver | From | – |

61 ~ (row label), 62 (Subscription), 63 (Ask), 60 (table)

FIG. 8

| TERMINAL 15b | | |
|---|---|---|
| BUDDY ID | Subscription | Ask |
| terminal15a@imserver | From | Subscribe |

FIG. 9

| TERMINAL 15a | | |
|---|---|---|
| BUDDY ID | Subscription | Ask |
| terminal15b@imserver | Both | – |

FIG. 10

| TERMINAL 15b | | |
|---|---|---|
| BUDDY ID | Subscription | Ask |
| terminal15a@imserver | Both | – |

FIG. 11

| ITEM | ACCESS LEVEL | VALUE |
|---|---|---|
| NICKNAME | PUBLIC | HANAKO |
| USERNAME | ROSTER | YAMADA HANAKO |
| SEX | ROSTER | FEMALE |
| E-MAIL | ROSTER | hanako@com |
| PHONE NUMBER | PRIVATE | 03-1234-5678 |
| AGE | PRIVATE | 22 |
| ADDRESS | ROSTER | TOKYO |
| BIRTHDAY | ROSTER | APRIL 1, 1980 |
| HOBBY | PUBLIC | WATCHING MOVIES |
| SELF-INTRODUCTION | ROSTER | I hope we will become good friends! |
| PHOTO | ROSTER | DATA ENCODED BY Base64 |
| INTRODUCTION WEBSITE | ROSTER | http://yahaa.co.jp |

```
<iq type="get">
  <query xmlns="        le_namespace">
    <nickname/>
    <username/>
    <e-mail/>
    <hobby/>
  </query>
</iq>
```

FIG. 18

```
<iq type="result" to="client1@imserver" from="client1@imserver">
<query xmlns="userprofile_namespace">
 <nickname access="public">HANAKO</nickname>
 <username access="roster">YAMADA HANAKO</username>
 <e-mail access="roster">hanako@com</e-mail>
 <hobby access="public">watching movies</hobby>
</query>
</iq>
```

FIG. 19

```
<iq type="get" to="client2@imserver">
  <query xmlns="userprofile_namespace">
    <nickname/>
    <username/>
    <e-mail/>
    <hobby/>
    <photo/>
  </query>
</iq>
```

FIG. 20

```
<iq type="result" to="client1@imserver" from="client2@imserver">
 <query xmlns="userprofile_namespace">
  <nickname>HANAKO</nickname>
  <hobby> watching movies </hobby>
 </query>
</iq>
```

INFORMATION PROVIDING APPARATUS, INFORMATION PROVIDING METHOD, AND PROGRAM

BACKGROUND OF THE INVENTION

1. Field of the Invention

The present invention relates to an information providing apparatus, an information providing method, and a program. In particular, the present invention relates to an information providing apparatus, an information providing method, and a program, in which personal information can be safely provided.

2. Description of the Related Art

In known instant messaging (IM), when a user's personal computer is connected to the Internet, the Internet-connecting state of another user registered in advance and a message from another user are automatically displayed in the user's personal computer. In this state, exchange of messages, chatting, and transmission of a file can be performed in real time (for example, see nonpatent literature 1: "Instant messaging" in Multimedia & Internet Dictionary, published by Digital Creators Conference, searched online on Aug. 20, 2002 (URL: http://www.kaigisho.ne.jp/literacy/midic/data/k2/k2109.htm)).

In IM, personal information of each user who has been registered with an IM server in order to receive an IM service is provided to another user who has established an exchange relationship. If an exchange relationship between a user A and a user B has been established, the user B is registered in the buddy list of the user A as his/her buddy, and the user A is also registered in the buddy list of the user B as his/her buddy. Personal information of a user is not provided to all users, but is provided to only a buddy connected in an exchange relationship. Therefore, concealment of personal information can be realized.

In order to establish an exchange relationship, a user (user A) transmits an "approach" to another user (user B). The user B receives the "approach", and transmits an "acceptance" to the user A if the user B wants to accept the "approach" from the user A (if the user B wants to establish an exchange relationship with the user A).

When the user A "approaches" the user B, the user A needs to know the ID of the user B. Also, when the user B transmits an "acceptance" to the user A, the user B needs to know the ID of the user A. In order to obtain the ID, the users directly negotiate with each other so as to give the ID to each other.

Alternatively, an ID can be obtained by searching for the ID of a user belonging to an interesting category by using disclosed personal information which has been stored in advance.

However, for example, when the user B is registered with the IM service but the user A is not registered with the IM service, the user B can give his/her ID to the user A. However, since the user A has not been registered with the IM service and does not have an ID, the user A cannot give his/her ID to the user B.

In this case, the user A first registers himself/herself with the IM service so as to obtain an ID. Then, the user A transmits an "approach" to the user B based on the ID of the user B. However, the user B does not know the ID of the user A. Therefore, the user B cannot identify the user A: if the user A is a stranger or a user to which the user B has given his/her ID, when the user B determines to or not to accept the "approach". In this case, the user B has to negotiate with the user A again, which is inconvenient.

Japanese Unexamined Patent Application Publication No. 2000-78182 suggests the following method. A level (information level) is set to personal information in advance and a level of a user (user level) is determined based on the number of times the user refers to the personal information, so that each user can refer to personal information at the information level corresponding to his/her user level.

Accordingly, in the IM, an information level may be set to personal information of each buddy and a buddy level is set to each buddy.

However, when a user level is determined in accordance with the frequency of referring to personal information, the following problem is caused. That is, when the user B who has received an "approach" from the user A wants to refer to the personal information of the user A in order to determine to or not to accept the "approach", that reference is the first reference, and thus the user B cannot see the personal information of the user A.

A level of personal information can be segmentalized so as to confine personal information which can be referred to by a first referrer within narrow limits. In that case, however, it is difficult to determine to or not to accept an "approach".

Different user levels may be set to users registered in a buddy list and unregistered users, and reference to personal information may be restricted based on the user levels. However, when a user who is not registered in a buddy list and who is a first referrer is permitted to refer to personal information, all users are permitted to refer to personal information. In this case, concealment of personal information cannot be ensured.

If concealment of personal information cannot be ensured, detailed personal information is less likely to be registered by users. As a result, it becomes difficult for a user to search for another user who is compatible with him/her in many aspects so as to register the compatible user as a buddy (to establish an exchange relationship).

SUMMARY OF THE INVENTION

The present invention has been made in view of the above-described situation, and it is an object of the present invention to provide a large amount of personal information safely.

An information providing apparatus of the present invention includes: a receiving unit for receiving a request for obtaining the information of a first user, the request being transmitted from an information processor of a second user; a storage unit for storing relationship information which defines a relationship between the first user and the second user; a setting unit for setting a disclosure level as an access level to the information of the first user of the second user, who has transmitted the request received by the receiving unit, to any of a first level for permitting access to all items of the information, a second level for permitting access to fewer items of the information than in the first level, and a third level for permitting access to fewer items of the information than in the second level, based on the relationship information stored in the storage unit; a selecting unit for selecting items to be disclosed to the second user from the information of the registered first user based on the disclosure level of the second user set by the setting unit; and a transmitting unit for transmitting the items selected by the selecting unit to the information processor of the second user.

The setting unit may set the disclosure level to the second level when the first user requests establishment of a predefined specific relationship to the second user or when the specific relationship between the first and second users is established.

The setting unit may set the disclosure level to the third level when the first user does not request establishment of the specific relationship to the second user or when the specific relationship between the first and second users is not established.

The setting unit may set the disclosure level to the first level when the first user is the second user.

An information providing method of the present invention includes: a receiving step of receiving a request for obtaining the information of a first user, the request being transmitted from an information processor of a second user; a storing step of storing relationship information which defines a relationship between the first user and the second user; a setting step of setting a disclosure level as an access level to the information of the first user of the second user, who has transmitted the request received in the receiving step, to any of a first level for permitting access to all items of the information, a second level for permitting access to fewer items of the information than in the first level, and a third level for permitting access to fewer items of the information than in the second level, based on the relationship information stored in the storing step; a selecting step of selecting items to be disclosed to the second user from the information of the registered first user based on the disclosure level of the second user set in the setting step; and a transmitting step of transmitting the items selected in the selecting step to the information processor of the second user.

A program of the present invention includes: a receiving step of receiving a request for obtaining the information of a first user, the request being transmitted from an information processor of a second user; a setting step of setting a disclosure level as an access level to the information of the first user of the second user, who has transmitted the request received in the receiving step, to any of a first level for permitting access to all items of the information, a second level for permitting access to fewer items of the information than in the first level, and a third level for permitting access to fewer items of the information than in the second level, based on stored relationship information which defines a relationship between the first user and the second user; a selecting step of selecting items to be disclosed to the second user from the information of the registered first user based on the disclosure level of the second user set in the setting step; and a transmitting step of transmitting the items selected in the selecting step to the information processor of the second user.

In the present invention, when a request for obtaining information of the first user from the second user is received, the disclosure level of the second user is set based on the relationship information of the first and second users, items to be disclosed are selected in accordance with the set disclosure level, and the selected items are transmitted to the information processor of the second user.

BRIEF DESCRIPTION OF THE DRAWINGS

FIG. 3 shows an example of a buddy list held by a buddy list holder shown in FIG. 2;

FIG. 5 shows an example of an updated buddy list held by the buddy list holder shown in FIG. 2;

FIG. 6 shows an example of an updated buddy list held by the buddy list holder shown in FIG. 2;

FIG. 7 shows an example of an updated buddy list held by the buddy list holder shown in FIG. 2;

FIG. 8 shows an example of an updated buddy list held by the buddy list holder shown in FIG. 2;

FIG. 9 shows an example of an updated buddy list held by the buddy list holder shown in FIG. 2;

FIG. 10 shows an example of an updated buddy list held by the buddy list holder shown in FIG. 2;

FIG. 11 shows an example of personal information held by a personal information holder shown in FIG. 2;

FIG. 17 shows an example of a message transmitted by a terminal shown in FIG. 2 in order to obtain personal information;

FIG. 18 shows an example of personal information transmitted by the personal information controller shown in FIG. 2;

FIG. 19 shows an example of a message transmitted by a terminal shown in FIG. 2 in order to obtain personal information;

FIG. 20 shows an example of personal information transmitted by the personal information controller shown in FIG. 2;

DESCRIPTION OF THE PREFERRED EMBODIMENTS

Figure 1:
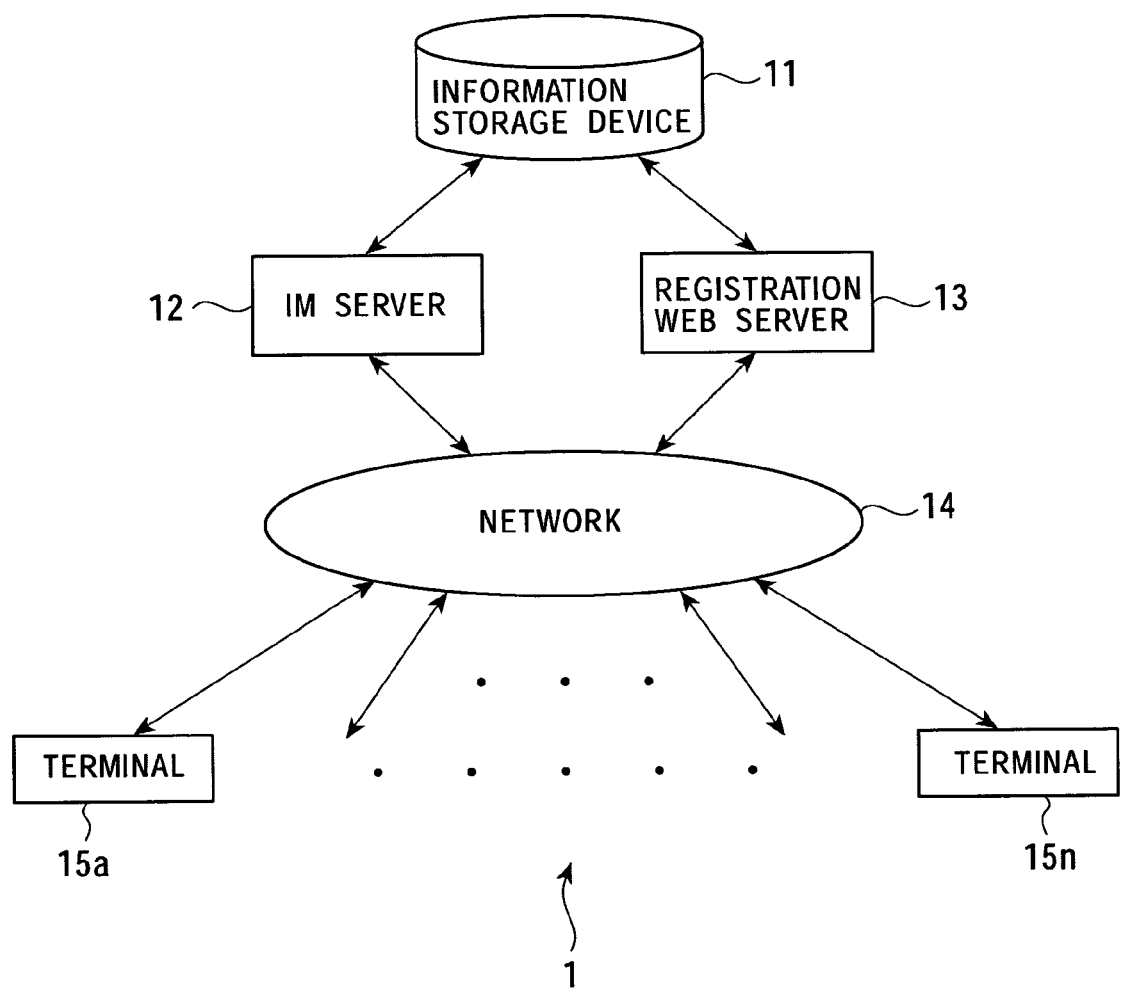
FIG. 1 is a block diagram showing the configuration of an IM system according to an embodiment of the present invention.

Hereinafter, embodiments of the present invention will be described with reference to the drawings. FIG. 1 shows the configuration of an IM system 1 according to an embodiment of the present invention.

In the IM system 1, an IM server 12, a registration Web server 13, and terminals 15a to 15n are connected through a network 14, such as the Internet. Also, an information storage device 11 is connected to the IM server 12 and the registration Web server 13.

The terminals 15a to 15n exchange information through the network 14. The IM server 12 updates buddy lists (FIG. 3), which are stored in the information storage device 11, in accordance with messages of "approach", "acceptance", and "refusal" transmitted by the terminals 15a to 15n (details will be described later with reference to FIG. 4). The registration Web server 13 allows the information storage device 11 to store in advance personal information (FIG. 11) of each user input by the terminals 15a to 15n in accordance with commands of the users.

When one of the terminals 15a to 15n requests obtaining personal information of the user of another terminal, the IM server 12 selects accessible item(s) from the personal information stored in the information storage device 11, based on the buddy list which holds relationship information defining relationship among the users, and transmits the selected item(s) through the network 14 to the terminal which has required the personal information. Of course, the users of the terminals 15a to 15n register themselves with the IM server 12 in advance so as to receive IM service from the IM server 12, and an ID is given to each user.

Figure 2:
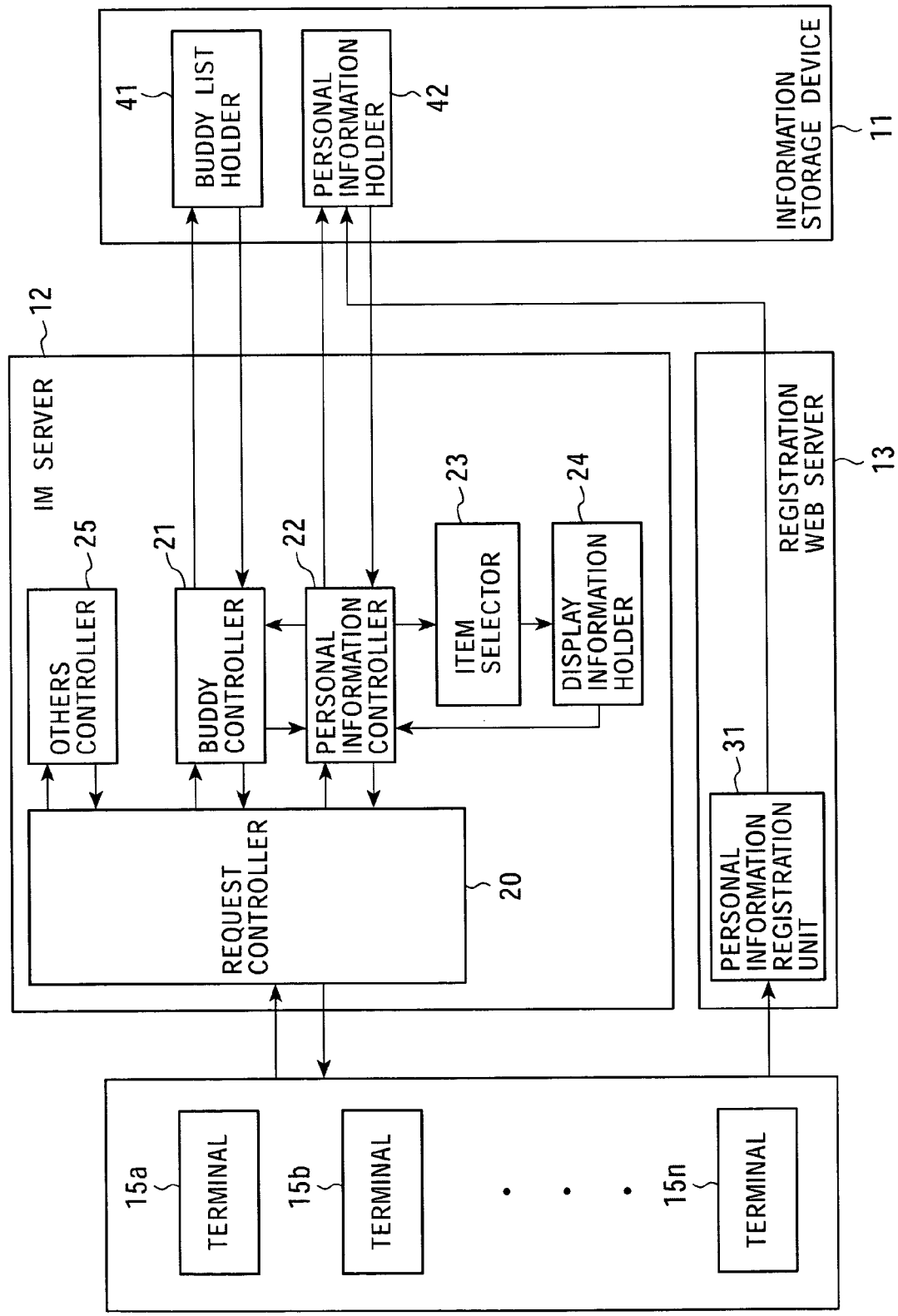
FIG. 2 is a block diagram showing the configuration of the IM system shown in FIG. 1.

FIG. 2 shows the configuration of each unit of the IM system applying the present invention. Hereinafter, when the terminals 15a to 15n need not be distinguished from each other, they will be referred to as terminals 15. Also, arbitrary terminals 15 may be referred to as terminals 15i and 15j, for example.

When the terminal 15i wants to establish an exchange relationship with the terminal 15j, the terminal 15i transmits an "approach" to a request controller 20 of the IM server 12. The request controller 20 receives the "approach" and transmits it to a buddy controller 21. The buddy controller 21 receives the "approach", updates the buddy list of the terminal 15i held in a buddy list holder 41 of the information storage device 11 to "approaching", and notifies the terminal 15i of the update through the request controller 20. The same process is performed when the terminal 15j responds to the "approach".

When the terminal 15i wants to obtain personal information of the user of the terminal 15j, the terminal 15i transmits a request for the personal information to the request controller 20. The request controller 20 receives the request and then transmits the request to a personal information controller 22 of the IM server 12. The personal information was registered in a personal information holder 42 of the information storage device 11 by a personal information registration unit 31 when the terminal 15j transmitted a request of registration to the personal information registration unit 31 of the registration Web server 13. The personal information controller 22 receives the request for the personal information and controls the buddy controller 21, so as to obtain the buddy list of the terminal 15j from the buddy list holder 41. Also, the personal information controller 22 obtains the requested personal information of the user of the terminal 15j from the personal information holder 42.

The personal information controller 22 transmits the obtained buddy list and personal information of the terminal 15j to an item selector 23 of the IM server 12. The item selector 23 selects item(s) which can be displayed based on the buddy list and personal information of the terminal 15j, and allows the display information holder 24 of the IM server 12 to hold the item(s) and information corresponding to the item(s). The personal information controller 22 obtains the information which can be displayed from the display information holder 24, and transmits the information to the terminal 15i through the request controller 20.

Further, when the terminal 15 requests registration in the IM service, the request is transmitted to the request controller 20, which transmits the request to the others controller 25. The others controller 25 receives the request and performs control in accordance with the request.

FIG. 3 shows an example a buddy list 60 of the terminal 15a, the buddy list 60 being stored in the buddy list holder 41. Buddy means a friend, and corresponds to another terminal connected through the network 14. The buddy list 60 includes buddy ID(s) 61, Subscription 62, and Ask 63.

The buddy ID 61 indicates IDs for identifying buddies. The Subscription 62 indicates exchange relationship between terminals (details will be described later with reference to FIG. 4), in which "None" indicates that exchange relationship has not been established between two terminals. "To" indicates that exchange relationship has been approved by another terminal, and "From" indicates that the terminal 15a has approved exchange relationship with another terminal. Further, "Both" indicates that exchange relationship has been mutually approved by the two terminals. Also, "Subscribe" in the Ask 63 indicates "approaching".

That is, in the example shown in FIG. 3, the terminal 15a has not established exchange relationship with the terminal 15b, which is the terminal having the buddy ID 61 of terminal 15b@imserver (Subscription 62 indicates "None"). On the other hand, the terminal 15a is "approaching" the terminal 15c, which is the terminal having the buddy ID 61 of terminal 15c@imserver (Ask 63 indicates "subscribe"). Also, the terminal 15d, which is the terminal having the buddy ID 61 of terminal 15d@imserver, has approved exchange relationship with the terminal 15a (Subscription 62 indicates "To"), and the terminal 15a has approved exchange relationship with the terminal 15e, which is the terminal having the buddy ID 61 of terminal 15e@imserver (Subscription 62 indicates "From"). Further, the terminal 15a has approved exchange relationship with the terminal 15f, which is the terminal having the buddy ID 61 of terminal 15f@imserver (Subscription 62 indicates "From"), and also the terminal 15a is "approaching" the terminal 15f, requesting approval of exchange relationship therewith (Ask 63 indicates "Subscribe"). Also, the terminal 15a has established exchange relationship with the terminal 15g, which is the terminal having the buddy ID 61 of terminal 15g@imserver. That is, exchange relationship has been approved by both terminals 15a and 15g (Subscription 62 indicates "Both").

Figure 4:
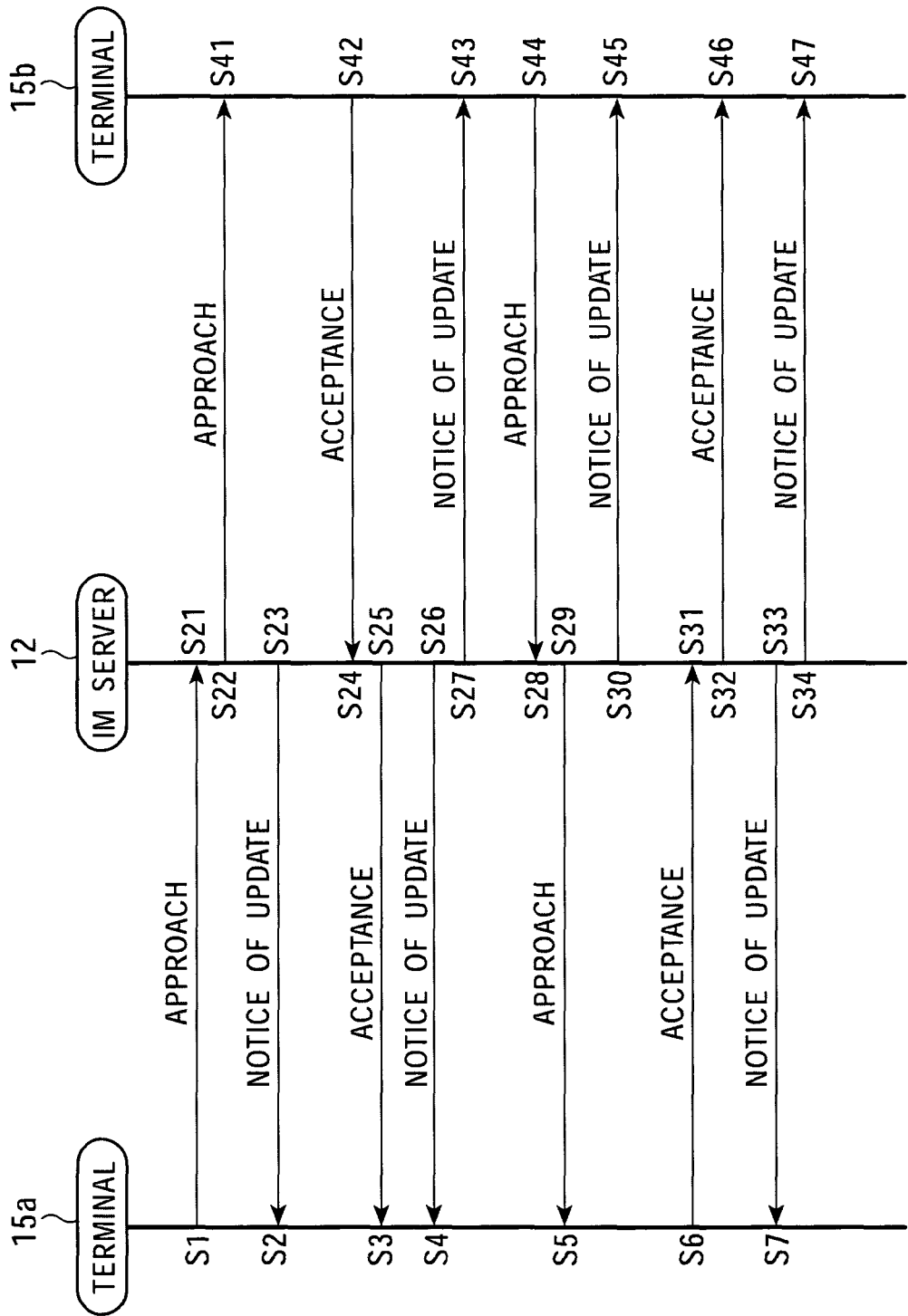
FIG. 4 illustrates an operation for establishing an exchange relationship between terminals shown in FIG. 2.

Next, the operation of the system shown in FIG. 2 will be described with reference to FIG. 4. Herein, the terminals 15a and 15b establish exchange relationship.

When the user of the terminal 15a wants to establish an exchange relationship with the user of the terminal 15b, the terminal 15a transmits an "approach" (request for approval of exchange relationship) to the terminal 15b to the buddy controller 21 of the IM server 12 in accordance with a user's command in step S1. In step S21, the buddy controller 21 receives the "approach" to the terminal 15b from the terminal 15a. In step S22, the buddy controller 21 transmits the "approach" from the terminal 15a to the terminal 15b. In step S41, the terminal 15b receives the "approach" from the terminal 15a from the buddy controller 21.

In step S23, the buddy controller 21 updates the buddy list 60 of the terminal 15a held in the buddy list holder 41, and notifies the terminal 15a of the update. Then, in step S2, the terminal 15a receives a notice of update from the buddy controller 21.

FIG. 5 shows an example of an updated buddy list 60 of the terminal 15a. For example, before "approach" (before update), the Subscription 62 of the terminal 15b is "None"

and the Ask 63 is "−" (unregistered), as shown in FIG. 3. That is, the buddy list 60 in FIG. 3 shows that neither of the terminals 15*a* and 15*b* has performed "approach". After that, when the terminal 15*a* transmits an "approach" to the terminal 15*b*, the Ask 63 of the terminal 15*b* is changed to "Subscribe", while the Subscription 62 remains "None", as shown in FIG. 5. That is, the buddy list 60 in FIG. 5 shows that the terminal 15*a* is "approaching" the terminal 15*b*.

When the user of the terminal 15*b*, which has received the "approach", decides to establish an exchange relationship with the user of the terminal 15*a*, the terminal 15*b* transmits an "acceptance" of the "approach" from the terminal 15*a* to the buddy controller 21 in accordance with the user's command, in step S42. In step S24, the buddy controller 21 receives the "acceptance" from the terminal 15*b*. In step S25, the buddy controller 21 transmits the "acceptance" received from the terminal 15*b* to the terminal 15*a*. In step S3, the terminal 15*a* receives the "acceptance" from the terminal 15*b* from the buddy controller 21.

In step S26, the buddy controller 21 updates the buddy list 60 of the terminal 15*a* and notifies the terminal 15*a* of the update. In step S4, the terminal 15*a* receives a notice of update of the buddy list 60 from the buddy controller 21. In step S27, the buddy controller 21 also updates the buddy list 60 of the terminal 15*b* and notifies the terminal 15*b* of the update. In step S43, the terminal 15*b* receives a notice of update of the buddy list 60 from the buddy controller 21.

FIGS. 6 and 7 show examples of the buddy lists 60 of the terminals 15*a* and 15*b*, respectively. The buddy list 60 of the terminal 15*a* shown in FIG. 5 is updated to the state shown in FIG. 6. That is, the Subscription 62 of the terminal 15*b* is changed from "None" to "To", and the Ask 63 is changed from "Subscribe" to "−". That is, the buddy list 60 of the terminal 15*a* is updated to a state in which the "approach" has been "accepted" (passive).

As shown in FIG. 7, in the buddy list 60 of the terminal 15*b*, the Subscription 62 of the terminal 15*a* is changed to "From" and the Ask 63 is changed to "−". That is, the buddy list 60 of the terminal 15*b* is updated to a state in which the terminal 15*b* has "accepted" (active) the "approach".

The terminal 15*b* has "accepted" the "approach" from the terminal 15*a*, and thus it transmits an "approach" to the terminal 15*a* to the buddy controller 21 so as to establish an exchange relationship in step S44. In step S28, the buddy controller 21 receives the "approach" to the terminal 15*a* from the terminal 15*b*. In step S29, the buddy controller 21 transmits the "approach" from the terminal 15*b* to the terminal 15*a*. In step S5, the terminal 15*a* receives the "approach" from the terminal 15*b* from the buddy controller 21.

In step S30, the buddy controller 21 updates the buddy list 60 of the terminal 15*b* and notifies the terminal 15*b* of the update. In step S45, the terminal 15*b* receives a notice of update of the buddy list 60 from the buddy controller 21.

FIG. 8 shows an example of the updated buddy list 60 of the terminal 15*b*. The buddy list 60 of the terminal 15*b* shown in FIG. 7 is updated to the state shown in FIG. 8. That is, the Ask 63 of the terminal 15*a* is changed from "−"to "Subscribe", while the Subscription 62 remains "From". That is, after the terminal 15*b* has accepted the "approach" from the terminal 15*a*, the buddy list 60 of the terminal 15*b* is updated to a state where the terminal 15*b* is "approaching" the terminal 15*a*.

In step S6, the terminal 15*a* transmits an "acceptance" of the "approach" from the terminal 15*b* to the buddy controller 21. In step S31, the buddy controller 21 receives the "acceptance" from the terminal 15*a*. In step S32, the buddy controller 21 transmits the "acceptance" to the terminal 15*b*. In step S46, the terminal 15*b* receives the "acceptance" from the terminal 15*a* from the buddy controller 21.

In step S33, the buddy controller 21 updates the buddy list 60 of the terminal 15*a* and notifies the terminal 15*a* of the update. In step S7, the terminal 15*a* receives a notice of update of the buddy list 60 from the buddy controller 21. In step S34, the buddy controller 21 updates the buddy list 60 of the terminal 15*b* and notifies the terminal 15*b* of the update. In step S47, the terminal 15*b* receives a notice of update of the buddy list 60 from the buddy controller 21.

FIGS. 9 and 10 show examples of the updated buddy lists 60 of the terminals 15*a* and 15*b*, respectively. The buddy list 60 of the terminal 15*a* shown in FIG. 6 is updated to the state shown in FIG. 9. That is, the Subscription 62 of the terminal 15*b* is changed from "To" to "Both", while the Ask 62 remains "−". Also, the buddy list 60 of the terminal 15*b* shown in FIG. 8 is updated to the state shown in FIG. 10. That is, the Subscription 62 of the terminal 15*a* is changed from "From" to "Both", and the Ask 63 is changed from "Subscribe" to "−". That is, the buddy lists 60 of the terminals 15*a* and 15*b* are updated to a state showing that an exchange relationship between the terminals 15*a* and 15*b* has been established.

As described above, an exchange relationship between two terminals is established when both terminals transmit "approach" to each other and when both terminals accept the "approach". Also, the buddy list 60 of each terminal is updated every time "approach" or "acceptance" is transmitted.

A case where an exchange relationship is established has been described above. However, when an exchange relationship is not established (when the terminal 15*a* or 15*b* does not accept "approach"), the buddy list 60 is updated so as to indicate that an exchange relationship has not been established, and the process is completed.

For example, in step S42, when the terminal 15*b* transmits a "refusal" to the buddy controller 21, the buddy list 60 of the terminal 15*b* is not updated. On the other hand, the buddy list 60 of the terminal 15*a* shown in FIG. 5 is updated, that is, the Ask 63 is changed from "Subscribe" to "−", and then the process is completed.

In step S6, when the terminal 15*a* transmits a "refusal" to the IM server 12, the buddy list 60 of the terminal 15*a* is kept in the state shown in FIG. 6 and is not updated. Further, in the buddy list 60 of the terminal 15*b*, the Subscription 62 is not changed from the state shown in FIG. 8, but the Ask 63 is changed from "Subscribe" to "−". Then, the process is completed.

In the IM system applying the present invention, a level (disclosure level) of disclosing personal information of the user of the terminal 15 stored in the personal information holder 42 of the information storage device 11 is determined based on the "approach" and "acceptance".

FIG. 11 shows an example of personal information 80, which has been registered in the personal information holder 42 by the personal information registration unit 31 of the registration Web server 13. The personal information 80 includes item 81, access level 82, and value 83. The item 81 includes "nickname", "username", "sex", "e-mail", "phone number", "age", "address", "birthday", "hobby", "self-introduction", "photo", and "introduction website". The access level 82 includes "public", "roster" (open to group), and "private". The value 83 corresponds to specific contents of the item 81. The user requests registration of the personal information 80 to the personal information registration unit 31 through the terminal 15, so that the access level 82 and the value 83 are registered in accordance with the item 81.

In this example, the access level 82 of the value "HANAKO" of the item "nickname" and the value "watching movies" of the item "hobby" is set to "public". Also, the access level 82 of the value "YAMADA HANAKO" of the item "username", the value "female" of the item "sex", the value "hanako@com" of the item "e-mail", the value "Tokyo" of the item "address", the value "Apr. 1, 1980" of the item "birthday", the value "I hope we will become good friends!" of the item "self-introduction", the value "data encoded by Base64" of the item "photo", and the value "http://yahaa.co.jp" of the item "introduction website", is set to "roster". Further, the access level 82 of the value "03-1234-5678" of the item "phone number" and the value "22" of the item "age" is set to "private".

Figure 12:
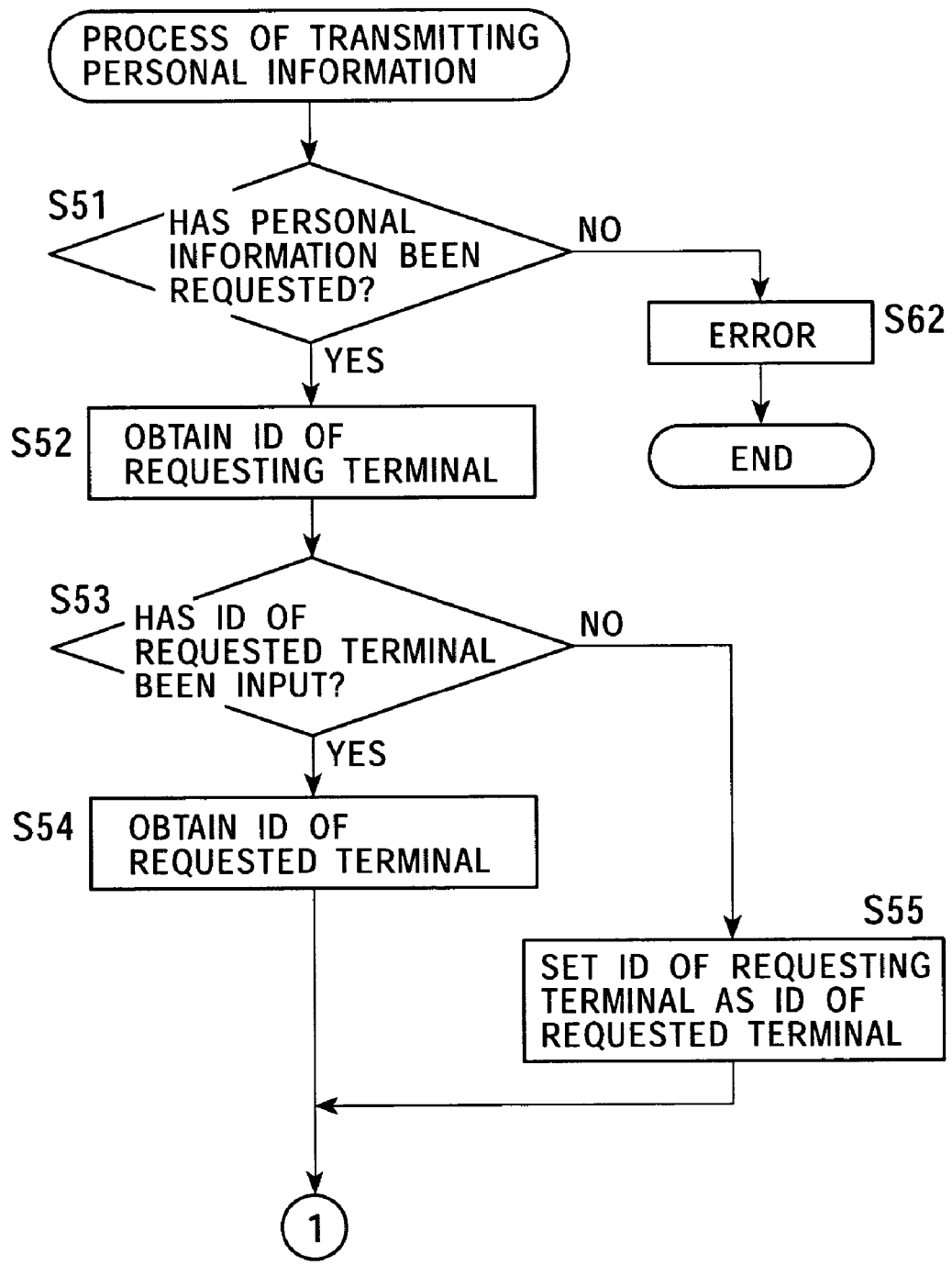
FIG. 12 is a flowchart of a process of transmitting personal information by a personal information controller shown in FIG. 2.

Now, a process of transmitting the personal information 80 based on the access level 82 will be described with reference to a flowchart shown in FIGS. 12 and 13, the process being performed by the personal information controller 22 of the IM server 12.

In step S51, the personal information controller 22 determines whether or not the terminal 15*i* has requested for obtaining the personal information 80 of the user of the terminal 15*j*. If it is determined that the terminal 15*i* has not requested the personal information 80, the personal information controller 22 determines that undefined request is generated. Then, the process proceeds to step S62, and the personal information controller 22 transmits the request from the terminal 15*i* as an error process, so as to complete the process.

In step S51, when it is determined that the terminal 15*i* has requested for obtaining the personal information 80 of the user of the terminal 15*j*, the process proceeds to step S52, where the personal information controller 22 obtains the ID of the requesting terminal (terminal 15*i*) from the personal information holder 42. Then, in step S53, the personal information controller 22 determines whether or not the ID of the requested terminal (terminal 15*j*) has been input. When it is determined that the ID of the requested terminal has been input, the process proceeds to step S54, where the personal information controller 22 obtains the ID of the requested terminal.

In step S53, when it is determined that the ID of the requested terminal has not been input, the process proceeds to step S55, where the personal information controller 22 sets the ID of the requesting terminal as the ID of the requested terminal (ID of the terminal 15*j*=ID of the terminal 15*i*).

After step S54 or S55, the process proceeds to step S56, where the personal information controller 22 determines whether or not the ID of the requested terminal=the ID of the requesting terminal. When it is determined that the ID of the requested terminal=the ID of the requesting terminal, that is, when the user of the requesting terminal wants to obtain his/her own personal information 80 (when the ID of the requesting terminal is set as the ID of the requested terminal, or when step S55 is performed), the process proceeds to step S57, where the personal information controller 22 sets the disclosure level of the requesting terminal to "PRIVATE" (the disclosure level enables browsing of entire personal information 80, the details will be described later with reference to FIG. 14).

In step S56, when it is determined that the ID of the requested terminal ≠ the ID of the requesting terminal (when the user of the requesting terminal wants to obtain the personal information 80 of the user of another terminal), the process proceeds to step S58, where the personal information controller 22 determines the disclosure level of the requesting terminal.

Now, a process of determining the disclosure level of the requesting terminal performed by the personal information controller 22 will be described with reference to the flowchart shown in FIG. 14. In step S81, the personal information controller 22 initially sets the disclosure level of the requesting terminal to "PUBLIC" (level for browsing item(s) of the personal information 80 in which access level 82 is set to "PUBLIC"). In step S82, the personal information controller 22 controls the buddy controller 21 so as to obtain the buddy list 60 of the requested terminal from the buddy list holder 41. In step S83, the personal information controller 22 determines whether or not the ID of the requesting terminal is registered in the buddy list 60 of the requested terminal. When it is determined that the ID of the requesting terminal is registered in the buddy list 60 of the requested terminal, the process proceeds to step S84, where the personal information controller 22 determines whether or not the exchange relationship between the requesting terminal and the requested terminal has been established (whether or not the Subscription 62 is "Both").

For example, the requesting terminal is the terminal 15*b* and the requested terminal is the terminal 15*a*. As shown in FIG. 9, in the buddy list 60 of the terminal 15*a*, if the Subscription 62 of the terminal 15*b* is "Both", it is determined that the exchange relationship between the terminals 15*a* and 15*b* has established. On the other hand, if the Subscription 62 is not "Both" ("None" (FIG. 5), "To" (FIG. 6), or "From"), it is determined that the exchange relationship between the terminals 15*a* and 15*b* has not been established.

In step S84, when it is determined that the exchange relationship between the requesting terminal and the requested terminal has not been established, the process proceeds to step S85, where the personal information controller 22 determines whether or not the requested terminal is "approaching" the requesting terminal.

For example, the requesting terminal is the terminal 15*b* and the requested terminal is the terminal 15*a*. As shown in FIG. 5, in the buddy list 60 of the terminal 15*a*, if the Ask 63 of the terminal 15*b* is "Subscribe", it is determined that the terminal 15*a* is "approaching" the terminal 15*b*. On the other hand, if the Ask 63 is not "Subscribe" ("−" (FIG. 6)), it is determined that the terminal 15*a* is not "approaching" the terminal 15*b*.

When it is determined that the exchange relationship between the requesting terminal and the requested terminal has been established in step S84, or when it is determined that the requested terminal is "approaching" the requesting terminal in step S85, the process proceeds to step S86, where the personal information controller 22 sets the disclosure level of the requesting terminal to "ROSTER" (level for browsing item(s) of the personal information 80 in which access level 82 is set to "roster" or "public".

When it is determined that the ID of the requesting terminal is not registered in the buddy list 60 in step S83, or when it is determined that the requested terminal is not "approaching" the requesting terminal in step S85, the personal information controller 22 leaves the disclosure level of the requesting terminal at "PUBLIC", which was set in step S81.

Figure 13:
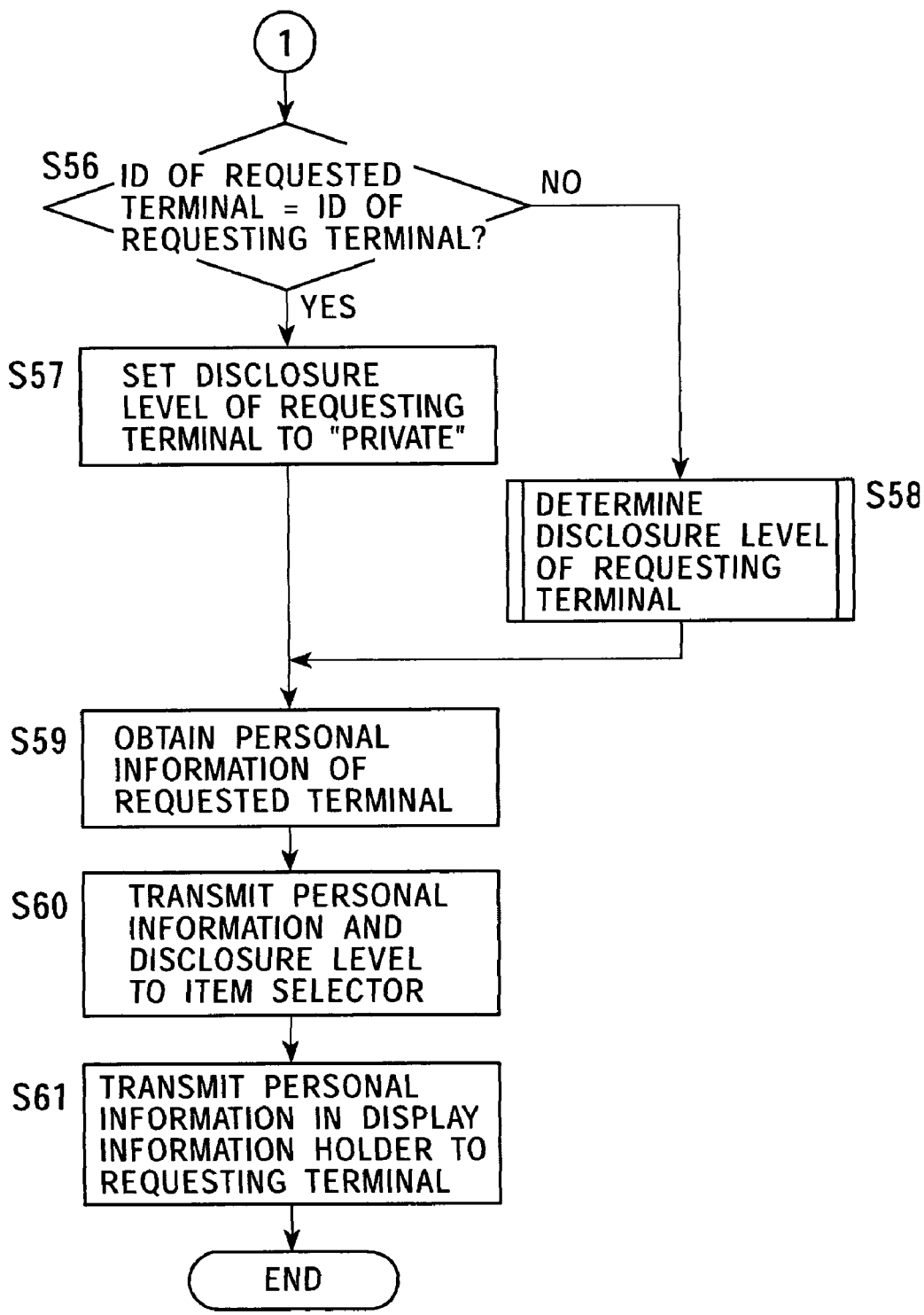
FIG. 13 is a flowchart of the process of transmitting personal information by the personal information controller shown in FIG. 2.

In this way, after the disclosure level of the requesting terminal has been determined in step S58 in FIG. 13 or after step S57, the process proceeds to step S59, where the personal information controller 22 obtains the personal information 80 of the user of the requested terminal from the personal information holder 42. Then, in step S60, the personal information controller 22 transmits the personal information 80 obtained in step S59 and the disclosure level of the requesting terminal determined in step S57 or S58 to the item selector 23. The item selector 23 receives the information and selects item(s) to be transmitted (item(s) to be provided to the requesting terminal) based on the information (details will be described later with reference to FIGS. 15 and 16), so as to allow the display information holder 24 to hold the selected item(s). In step S61, the personal information controller 22 transmits the item(s) 81 and the value(s) 83 held by the display information holder 24 to the requesting terminal, and the process is completed.

Figure 15:
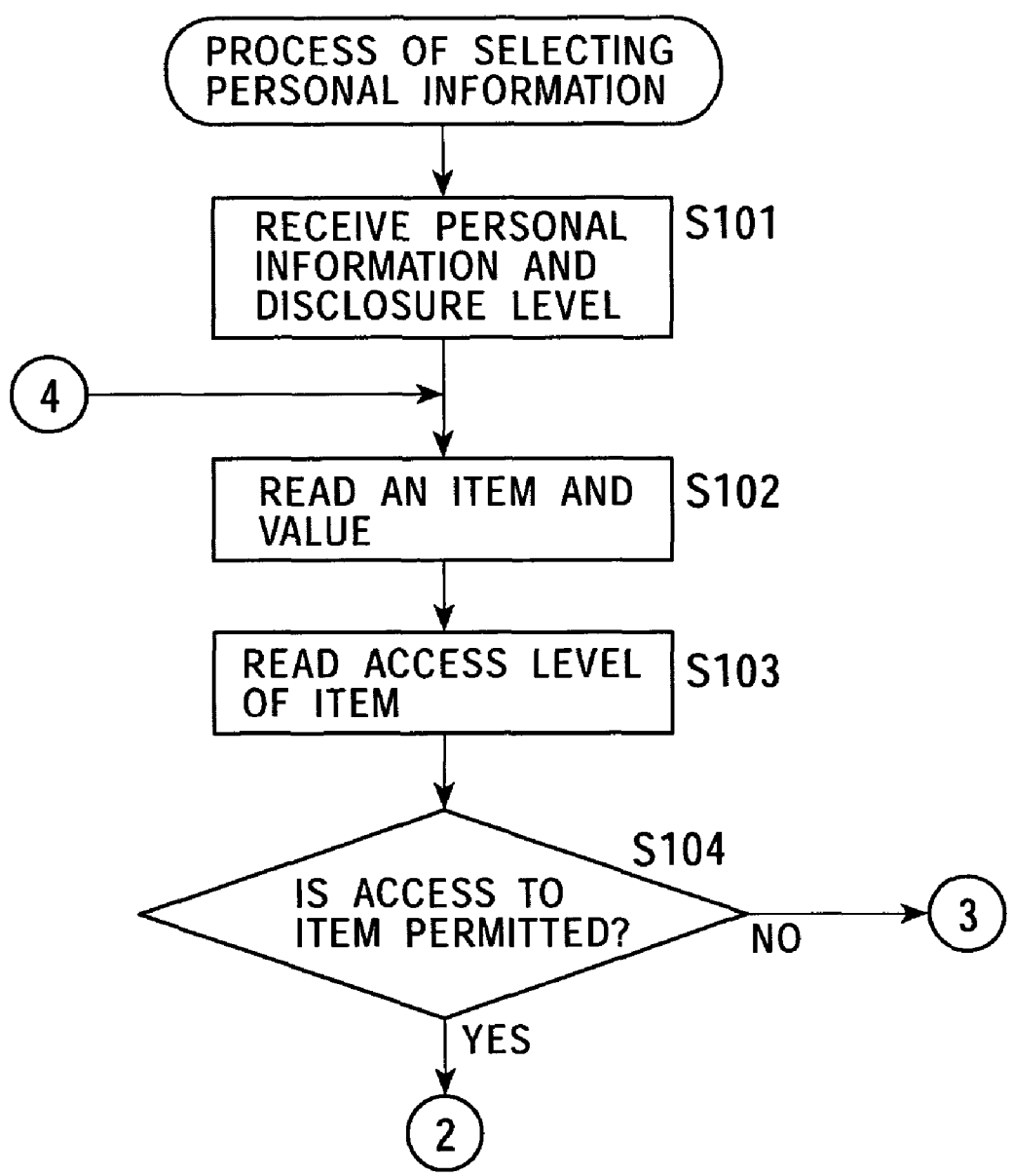
FIG. 15 is a flowchart of a process of selecting items from personal information by an item selector shown in FIG. 2.
Figure 16:
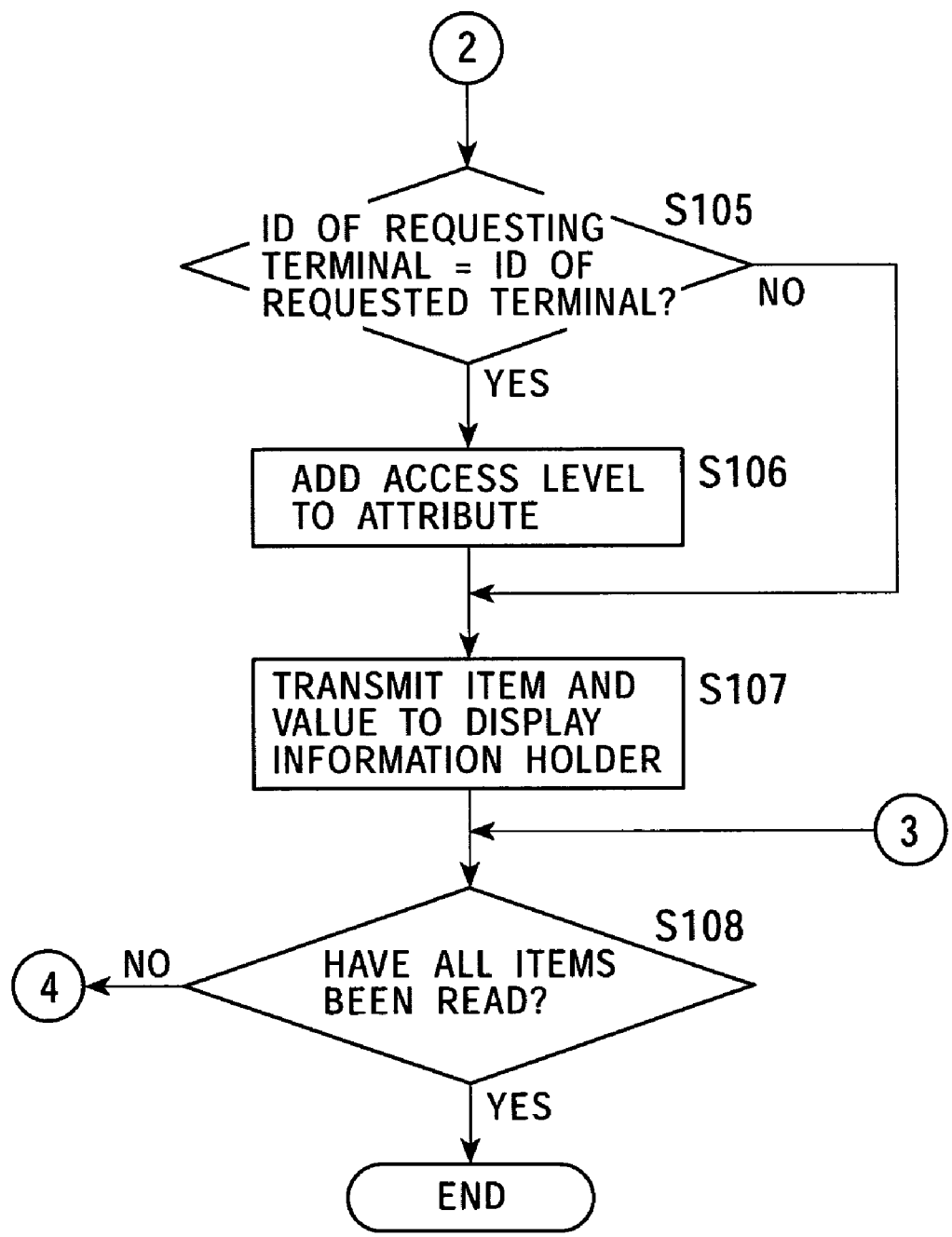
FIG. 16 is a flowchart of the process of selecting items from personal information by the item selector shown in FIG. 2.

Next, a process of selecting item(s) to be transmitted from the personal information 80 obtained in step S59 will be described with reference to the flowchart shown in FIGS. 15 and 16, the process being performed by the item selector 23.

In step S101, the item selector 23 receives the personal information 80, which has been transmitted by the personal information controller 22 in step S60 in FIG. 13, and the disclosure level ("PRIVATE", "ROSTER", or "PUBLIC") of the requesting terminal to the requested terminal. Then, in step S102, the item selector 23 reads out a predetermined item 81 and a value 83 corresponding to the item 81 from the received personal information 80. In step S103, the item selector 23 reads out the access level 82 ("public", "roster", or "private") corresponding to the item 81 from the received personal information 80. In step S104, the item selector 23 determines whether or not access to the target item 81 is permitted based on the access level 82 read out in step S103.

For example, when the disclosure level of the requesting terminal is set to "PRIVATE", the requesting terminal is permitted to access all the items 81 of the personal information 80 of the user of the requested terminal in which the access level 82 is set to "public", "roster", or "private" (in the example shown in FIG. 11, "nickname", "username", "sex", "e-mail", "phone number", "age", "address", "birthday", "hobby", "self-introduction", "photo", and "introduction website"). Also, when the disclosure level of the requesting terminal is set to "ROSTER", the requesting terminal is permitted to access the items 81 of the personal information 80 of the user of the requested terminal in which the access level 82 is set to "public" or "roster" (in the example shown in FIG. 11, "nickname", "username", "sex", "e-mail", "address", "birthday", "hobby", "self-introduction", "photo", and "introduction website"). Further, when the disclosure level of the requesting terminal is set to "PUBLIC", the requesting terminal is permitted to access the items 81 of the personal information 80 of the user of the requested terminal in which the access level 82 is set to "public" (in the example shown in FIG. 11, "nickname" and "hobby").

When it is determined that access to the item 81 is permitted in step S104, the process proceeds to step S105, where the item selector 23 determines whether or not the ID of the requesting terminal=the ID of the requested terminal (whether or not the requesting terminal is accessing his/her personal information 80 (disclosure level is "PRIVATE")). When it is determined that the ID of the requesting terminal=the ID of the requested terminal, the process proceeds to step S106, where the item selector 23 adds the access level 82 to the attribute of the item 81 (an example will be described later with reference to FIG. 18).

When it is determined that the ID of the requesting terminal ≠ the ID of the requested terminal (when the requesting terminal is accessing the personal information 80 of another user) in step S105, or after step S106, the process proceeds to step S107, where the item selector 23 transfers the item(s) 81 and the value(s) 83 corresponding to the item(s) 81 to the display information holder 24, which holds the item(s) 81 and the value(s) 83.

After step S107 or when it is determined that access to the item 81 is not permitted in step S104, the process proceeds to step S108, where the item selector 23 determines whether or not all the items 81 have been read out. When it is determined that all the items have not been read out, the process returns to step S102, where the item selector 23 selects another item 81, and repeats the same steps with regard to the selected item 81. When it is determined that all the items 81 have been read out in step S108, the process is completed.

In this way, by repeating the above-described steps, all the accessible items 81 and values 83 are held in the display information holder 24. For example, when the disclosure level of the requesting terminal is set to "PUBLIC" and when the access level 82 of the personal information 80 of the requested terminal is set in the manner shown in FIG. 11, the value "HANAKO" of the item "nickname" and the value "watching movies" of the item "hobby" are held in the display information holder 24.

In the above-description, the personal information controller 22 transmits all the items 81 held in the display information holder 24 to the requesting terminal. Alternatively, only the item(s) 81 specified by the requesting terminal and the corresponding value(s) 83 may be transmitted.

FIG. 18 shows an example of the items 81 and the corresponding values 83 transmitted by the personal information controller 22, the items and values being transmitted when the requesting terminal specifies the items 81 to be browsed (transmitted) in a manner shown in the message in FIG. 17. In the example shown in FIG. 17, the requesting terminal requests its own personal information 80 (requesting terminal=requested terminal).

In the example shown in FIG. 17, the requesting terminal requests access to the items 81: "nickname", "username", "e-mail", and "hobby". In this case, the disclosure level of the requesting terminal is set to "PRIVATE". Therefore, when the access level 82 of the personal information 80 of the user of the requested terminal is set in a manner shown in FIG. 11, the personal information controller 22 transmits the value "HANAKO" of the item "nickname", the value "YAMADA HANAKO" of the item "username", the value "hanako@com" of the item "e-mail", and the value "watching movies" of the item "hobby", as shown in the message in FIG. 18. At this time, the access level "public" corresponding to the items "nickname" and "hobby", and access level "roster" corresponding to the items "username" and "e-mail", are added to the items 81.

In another case, the requesting terminal requests the personal information 80 of another user and the disclosure level of the requesting terminal is set to "PUBLIC". FIG. 20 shows an example of the items 81 and the corresponding values 83, which are transmitted by the personal information controller 22 when the requesting terminal specifies the items 81 in a manner shown in FIG. 19.

In the example shown in FIG. 19, the requesting terminal requests access to the items 81: "nickname", "username", "e-mail", "hobby", and "photo". In this case, the disclosure level of the requesting terminal is set to "PUBLIC". Therefore, the personal information controller 22 transmits only the values 83 of the items 81 of the personal information 80 in which the access level 82 is set to "public".

That is, when the requesting terminal accesses the personal information 80 shown in FIG. 11, the personal information controller 22 transmits only the value "HANAKO" of the item "nickname" and the value "watching movies" of the item "hobby", in which the access level 82 is set to "public". Also, in this case, the requesting terminal is not requesting its own personal information 80 (the requested terminal is not the requesting terminal), and thus the access level 82 is not added.

As described above, in the present invention, access level is not added when the requesting terminal accesses the personal information of another user. Therefore, the requesting terminal cannot know the reason why it cannot access personal information: because the access level of each item is not set or because the value itself is not input. Accordingly, the access level of each item of each user can be protected against other users' access.

Figure 21:
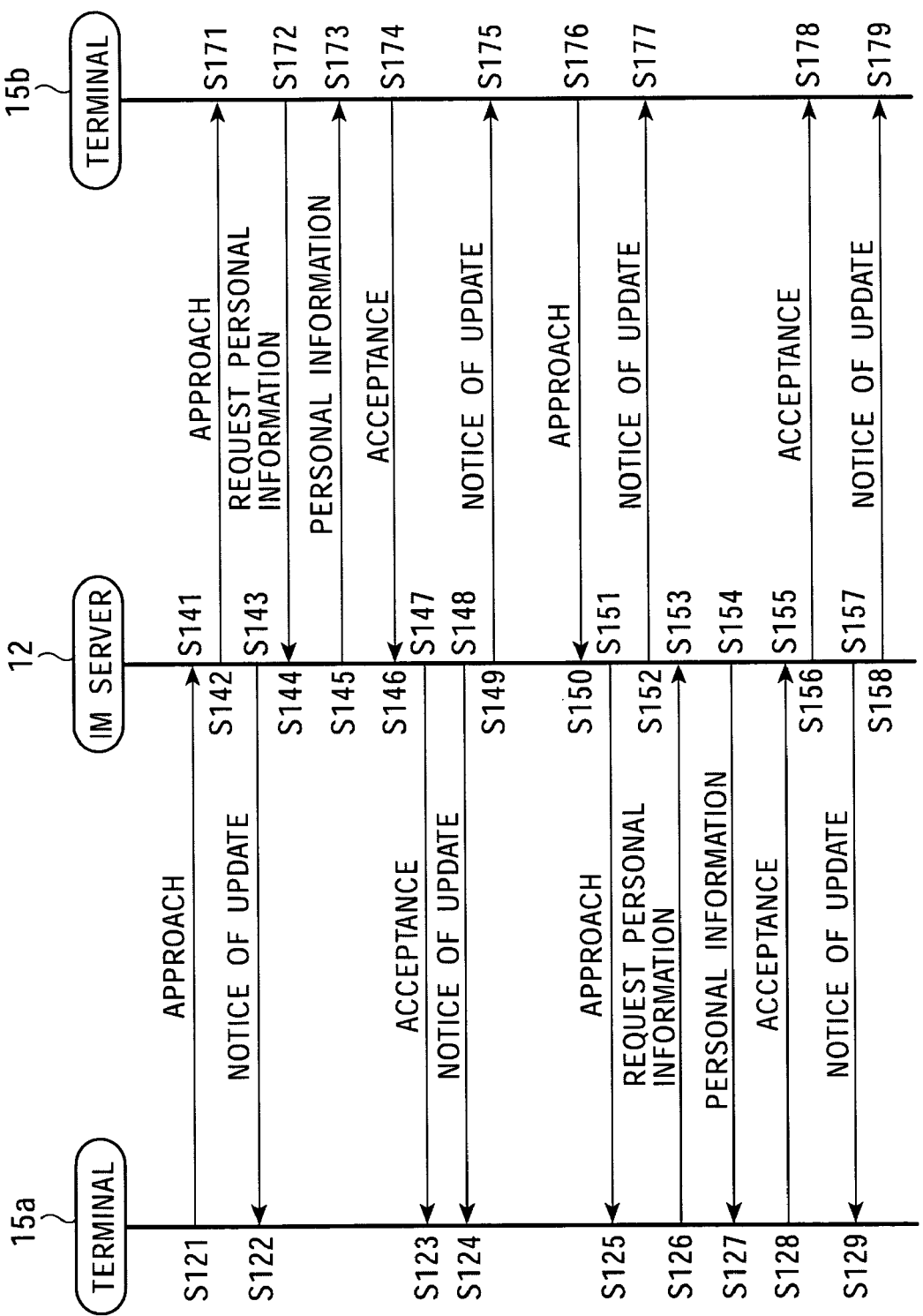
FIG. 21 illustrates an operation of the IM system shown in FIG. 2.

Next, the entire operation of the IM system, in which the terminal 15a "approaches" the terminal 15b and the terminals 15a and 15b obtain each other's personal information 80 so as to determine "acceptance" and to establish an exchange relationship, will be described with reference to FIG. 21.

In step S121, the terminal 15a transmits an "approach" to the terminal 15b to the buddy controller 21 of the IM server 12. In step S141, the buddy controller 21 receives the "approach" to the terminal 15b from the terminal 15a. In step S142, the buddy controller 21 transmits the "approach" from the terminal 15a to the terminal 15b. In step S171, the terminal 15b receives the "approach" from the terminal 15a from the buddy controller 21.

In step S143, the buddy controller 21 updates the buddy list 60 held by the buddy list holder 41 and notifies the terminal 15a of the update. At this time, the part regarding the terminal 15b in the buddy list 60 of the terminal 15a is changed from the state shown in FIG. 3 to the state shown in FIG. 5. In step S122, the terminal 15a receives a notice of update of the buddy list 60 from the buddy controller 21.

When the user of the terminal 15b wants to obtain the personal information 80 of the user of the terminal 15a in order to determine to or not to "accept" the "approach", the terminal 15b transmits a request for obtaining the personal information 80 of the user of the terminal 15a to the personal information controller 22 of the IM server 12 based on a user's command in step S172. In step S144, the personal information controller 22 receives the request from the terminal 15b and performs the processes shown in FIGS. 12 to 14.

That is, the personal information controller 22 controls the buddy controller 21, obtains the buddy list 60 of the terminal 15a, and determines the disclosure level of the terminal 15b to the terminal 15a. In this case, the terminal 15a is "approaching" the terminal 15b (the Ask 63 of the buddy list 60 is "Subscribe"). Therefore, the disclosure level of the terminal 15b is set to "ROSTER" in step S86 in FIG. 14. Then, the item selector 23 performs the process of selecting personal information shown in FIGS. 15 and 16, so as to allow the display information holder 24 to hold the item(s) 81 and the value(s) 83 in which the access level 82 is set to "public" or "roster".

In step S145, the personal information controller 22 transmits information held by the display information holder 24 (item(s) 81 and value(s) 83 in which the access level 82 is set to "public" or "roster"). In step S173, the terminal 15b receives the personal information 80 of the user of the terminal 15a held by the display information holder 24 from the personal information controller 22.

Figure 22:
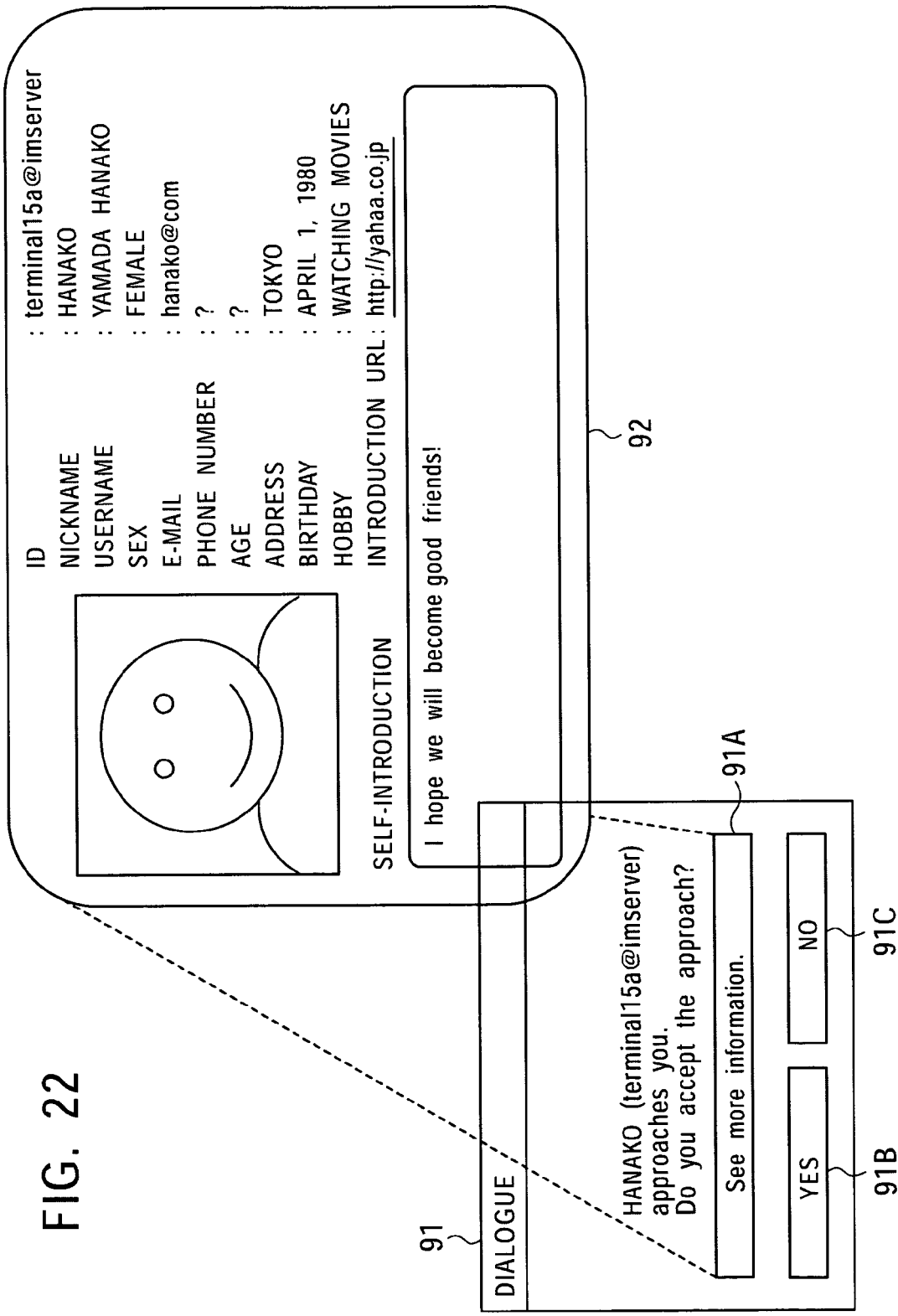
FIG. 22 shows an example of information displayed in a terminal shown in FIG. 2.

FIG. 22 shows an example of the personal information 80 displayed in the terminal 15b when the access level 82 of the personal information 80 of the user of the terminal 15a is set in a manner shown in FIG. 11. When an "approach" is transmitted from the terminal 15a to the terminal 15b, a "dialogue" 91 notifying of the approach is displayed in the terminal 15b. The dialogue 91 includes a message: "HANAKO (terminal 15a@imserver) approaches you. Do you accept the approach?"; a "See more information"-button 91A; an "YES"-button 91B; and a "NO"-button 91C for replying the "approach". When the user operates the "See more information"-button 91A (when step S172 in FIG. 21 is performed), the items 81 in which the access level 82 is set to "public" and "roster" ("nickname", "username", "sex", "e-mail", "address", "birthday", "hobby", "self-introduction", "photo", and "introduction website") and the values 83 ("HANAKO", "YAMADA HANAKO", "female", "hanako@com", "Tokyo", "Apr. 1, 1980", "watching movies", "I hope we will become good friends!", "photo (data encoded by Base64)", and "http://yahaa.co.jp" are displayed in a window 92. When the "See more information"-button 91A is not operated, the window 92 is not displayed.

When the terminal 15b obtains the personal information 80 of the terminal 15a and determines to "accept" the "approach", the terminal 15b transmits the "acceptance" of the "approach" to the buddy controller 21 in step S174. In step S146, the buddy controller 21 receives the "acceptance" of the "approach" from the terminal 15b. In step S147, the buddy controller 21 transmits the "acceptance" from the terminal 15b to the terminal 15a. In step S123, the terminal 15a receives the "acceptance" from the terminal 15b from the buddy controller 21.

In step S148, the buddy controller 21 updates the buddy list 60 of the terminal 15a and notifies the terminal 15a of the update. At this time, the buddy controller 21 changes the buddy list 60 of the terminal 15a from the state shown in FIG. 5 to the state shown in FIG. 6. In step S124, the terminal 15a receives a notice of update of the buddy list 60 from the buddy controller 21.

In step S149, the buddy controller 21 updates the buddy list 60 of the terminal 15b and notifies the terminal 15b of the update. At this time, the buddy controller 21 changes the buddy list 60 of the terminal 15b to the state shown in FIG. 7. In step S175, the terminal 15b receives a notice of update of the buddy list 60 from the buddy controller 21.

Since the terminal 15b has "accepted" the "approach" from the terminal 15a, the terminal 15b transmits an "approach" to the terminal 15a to the buddy controller 21 in step S176. In step S150, the buddy controller 21 receives the "approach" to the terminal 15a from the terminal 15b. In step S151, the buddy controller 21 transmits the "approach" from the terminal 15b to the terminal 15a. In step S125, the terminal 15a receives the "approach" from the terminal 15b from the buddy controller 21.

In step S152, the buddy controller 21 updates the buddy list 60 of the terminal 15b and notifies the terminal 15b of the update. At this time, the buddy controller 21 updates the buddy list 60 of the terminal 15b from the state shown in FIG. 7 to the state shown in FIG. 8. In step S177, the terminal 15b receives a notice of update of the buddy list 60 from the buddy controller 21.

In step S126, the terminal 15a transmits a request for obtaining the personal information 80 of the user of the terminal 15b to the personal information controller 22 so as to reply to the "approach". In step S153, the personal information controller 22 receives the request from the terminal 15a. Then, since the terminal 15b is "approaching" the terminal 15a (the Ask 63 of the buddy list 60 is "Subscribe"), the personal information controller 22 transmits the item(s) 81 and the value(s) 83 in which the access level 82 is set to "public" or "roster" to the terminal 15a in step S154. In step S127, the terminal 15a receives the personal information 80 of the user of the terminal 15b from the personal information controller 22.

The terminal 15a obtains the personal information 80 of the user of the terminal 15b and confirms that the terminal 15b is the terminal which the terminal 15a approached. Then, in step S128, the terminal 15a transmits an "acceptance" of the "approach" from the terminal 15b to the buddy controller 21. In step S155, the buddy controller 21 receives the "acceptance" of the "approach" from the terminal 15a. In S156, the buddy controller 21 transmits the "acceptance" from the terminal 15a to the terminal 15b. In step S178, the terminal 15b receives the "acceptance" from the terminal 15a from the buddy controller 21.

In step S157, the buddy controller 21 updates the buddy list 60 of the terminal 15a and notifies the terminal 15a of the update. At this time, the buddy controller 21 changes the buddy list 60 of the terminal 15a from the state shown in FIG.

6 to the state shown in FIG. 9. In step S129, the terminal 15a receives a notice of update of the buddy list 60 from the buddy controller 21.

In step S158, the buddy controller 21 updates the buddy list 60 of the terminal 15b and notifies the terminal 15b of the update. At this time, the buddy controller 21 changes the buddy list 60 of the terminal 15b from the state shown in FIG. 8 to the state shown in FIG. 10. In step S179, the terminal 15b receives a notice of update of the buddy list 6o from the buddy controller 21.

By performing the above-described steps, an exchange relationship between the terminals 15a and 15b is established.

The operation performed for establishing an exchange relationship has been described above. Next, an operation performed when the terminal 15b requests obtaining the personal information 80 of the user of the terminal 15a in a state where an exchange relationship has been established (the Subscription 62 of the buddy list 60 is "Both") or in a state where an exchange relationship has not been established (the Subscription 62 of the buddy list 60 is not "Both" ("None", "To", or "From")), will be described by comparison with reference to FIGS. 23 and 24.

Figure 23:
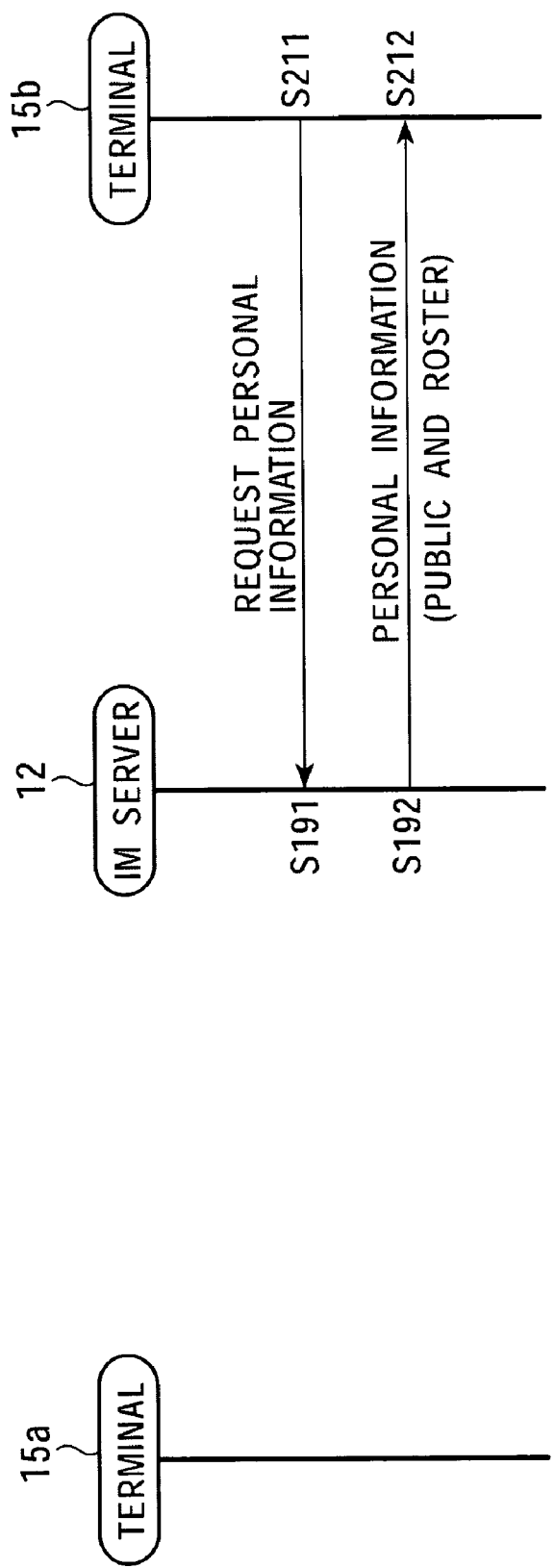
FIG. 23 illustrates an operation of the IM system when an exchange relationship is established.

FIG. 23 shows an operation performed when the terminal 15b obtains the personal information 80 of the user of the terminal 15a, in a case where an exchange relationship between the terminals 15a and 15b has been established. In step S211, the terminal 15b transmits a request for obtaining the personal information 80 of the user of the terminal 15a. In step S191, the personal information controller 22 of the IM server 12 receives the request from the terminal 15b.

Figure 14:
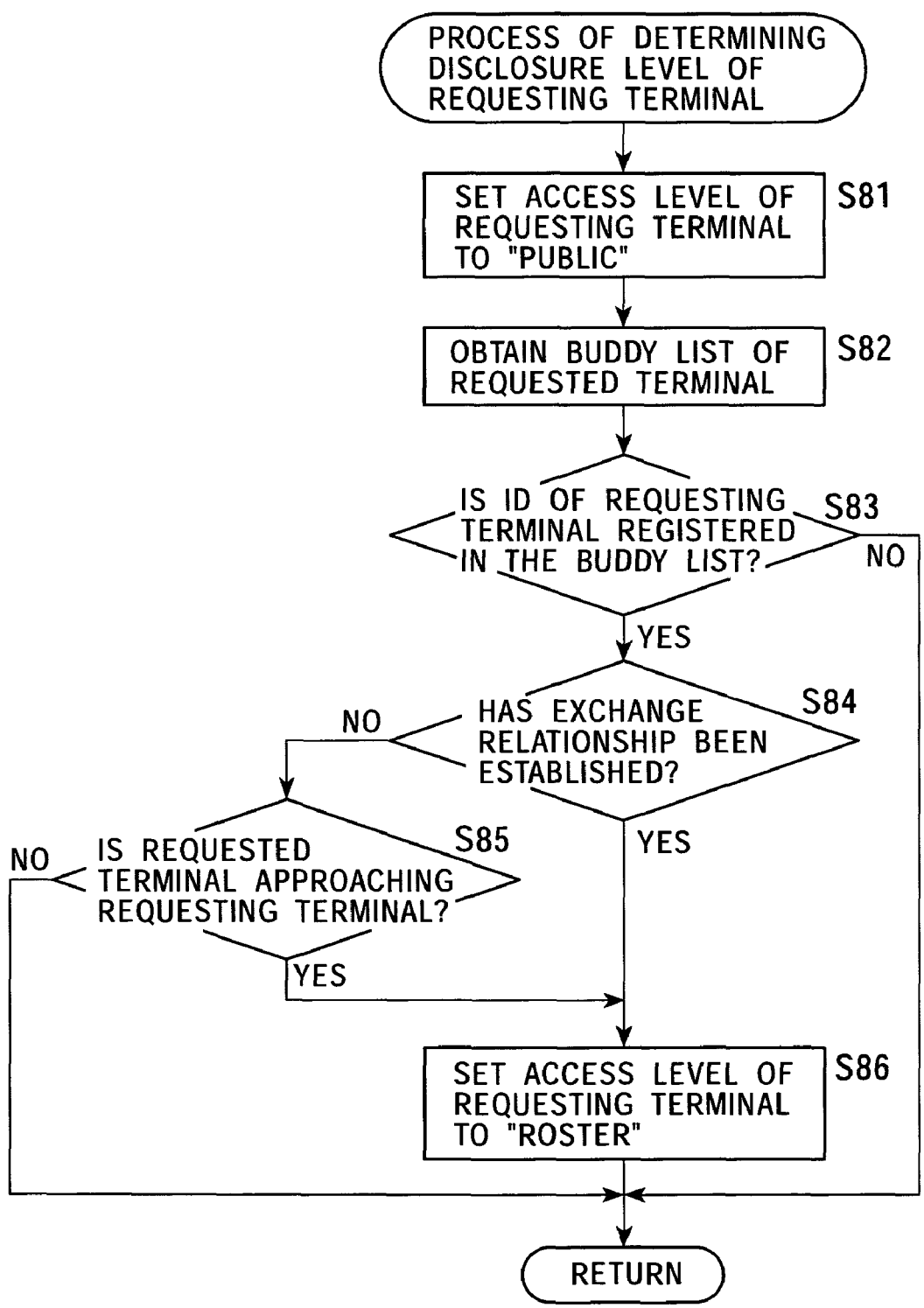
FIG. 14 is a flowchart of a process of determining the access level of a requesting terminal, corresponding to step S58 in FIG. 13.

Since the exchange relationship between the terminals 15a and 15b has been established, the personal information controller 22 performs steps S84 and S86 in FIG. 14 so as to set the disclosure level of the terminal 15b to the terminal 15a to "ROSTER". Therefore, in step S192, the personal information controller 22 transmits the item(s) 81 and the value(s) 83 of the personal information 80 in which the access level 82 is set to "public" or "roster", the item(s) and value(s) have been selected by the item selector 23 in the process of selecting personal information shown in FIGS. 15 and 16. In step S212, the terminal 15b receives the personal information 80 of the user of the terminal 15a from the personal information controller 22. At this time, the window shown in FIG. 22 is displayed in the terminal 15b.

Figure 24:
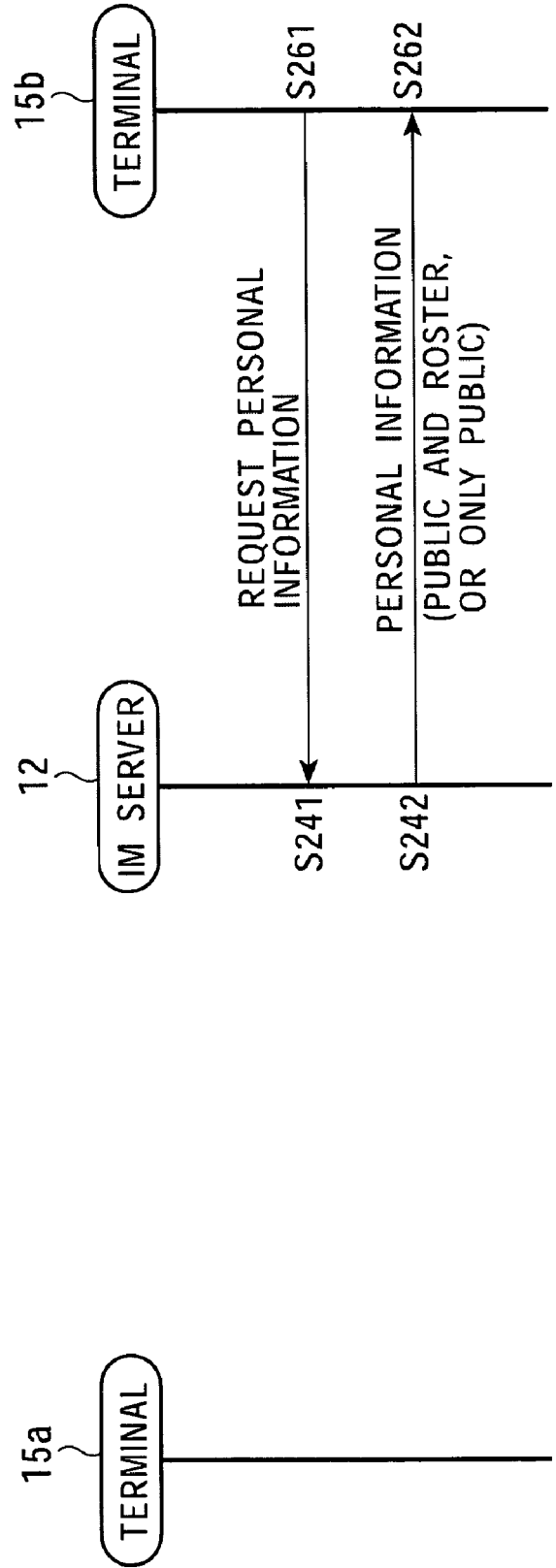
FIG. 24 illustrates an operation of the IM system when an exchange relationship is not established.

On the other hand, when the exchange relationship has not been established, the terminal 15b transmits a request for obtaining the personal information 80 of the user of the terminal 15a in step S261 in FIG. 24. In step S241, the personal information controller 22 receives the request from the terminal 15b.

Since the exchange relationship between the terminals 15a and 15b has not been established, the personal information controller 22 performs step S85 in FIG. 14. That is, when the terminal 15a is "approaching" the terminal 15b, the personal information controller 22 performs step S86 in FIG. 14, and transmits the item(s) 81 and the value(s) 83 in which the access level 82 is set to "public" or "roster" in step S242.

When the terminal 15a is not "approaching" the terminal 15b, the personal information controller 22 performs "No" of step S85 in FIG. 14, and transmits the item(s) 81 and the value(s) 83 in which the access level 82 is set to "public" in step S242.

In step S262, the terminal 15b receives the personal information 80 of the user of the terminal 15a from the personal information controller 22.

Figure 25:
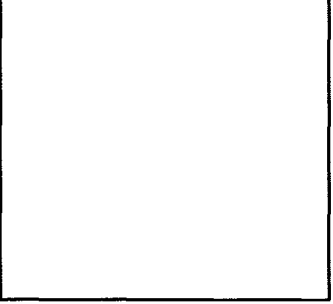
FIG. 25 shows an example of information displayed in a terminal shown in FIG. 2.

Accordingly, when the terminal 15a is "approaching" the terminal 15b, the window shown in FIG. 22 is displayed in the terminal 15b. On the other hand, when the terminal 15a is not "approaching" the terminal 15b, a window 92 shown in FIG. 25 is displayed. That is, when the terminal 15a is not "approaching" the terminal 15b, the "nickname": "HANAKO" and the "hobby": "watching movies", which are the items 81 in which the access level 82 is set to "public", are displayed.

As described above, in the present invention, when an exchange relationship has been established between two terminals, personal information in which the access level 82 is set to "public" or "roster" can be displayed. Thus, the user of one terminal can see detailed personal information of the user of the other terminal anytime. When the exchange relationship has not been established, only item(s) in which the access level 82 is set to "public" are displayed as long as one terminal does not receive "approach". Therefore, personal information of each user cannot be seen by a stranger, and thus privacy can be protected.

Next, an operation for requesting the personal information 80 of the user of the terminal 15a when the terminal 15b has received an "approach" or when the terminal 15b has transmitted an "approach", will be described by comparison with reference to FIGS. 26 and 27.

Figure 26:
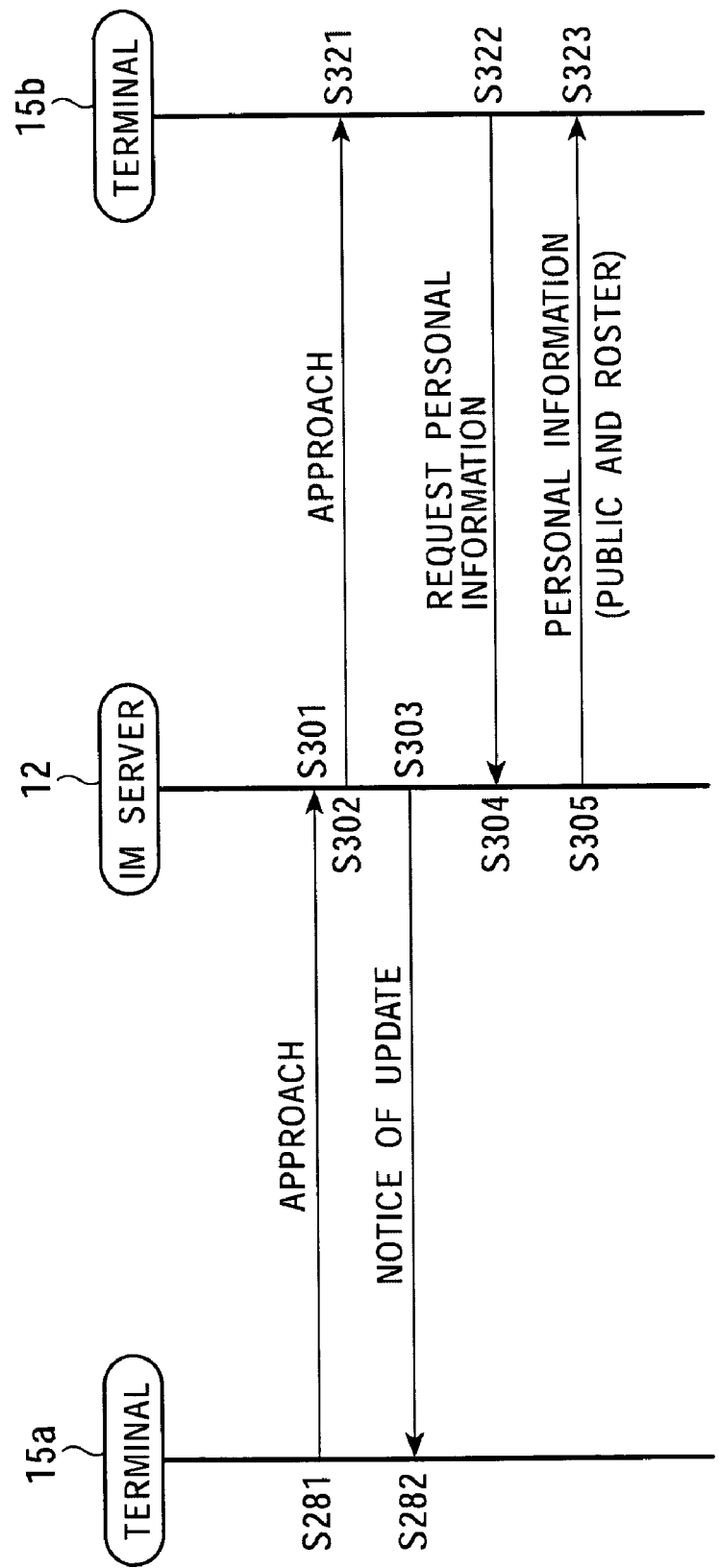
FIG. 26 illustrates an operation of the IM system when an "approach" is received.

FIG. 26 shows an operation of requesting the personal information 80 of the user of the 15a, the request being performed by the terminal 15b which has received an "approach" from the terminal 15a. In step S281, the terminal 15a transmits an "approach" to the terminal 15b to the buddy controller 21. In step S301, the buddy controller 21 receives the "approach" to the terminal 15b from the terminal 15a. In step S302, the buddy controller 21 transmits the "approach" from the terminal 15a to the terminal 15b. In step S321, the terminal 15b receives the "approach" from the terminal 15a from the buddy controller 21.

In step S303, the buddy controller 21 updates the buddy list 60 of the terminal 15a held by the buddy list holder 41 and notifies the terminal 15a of the update. At this time, the buddy controller 21 updates the buddy list 60 of the terminal 15a from the state shown in FIG. 3 to the state shown in FIG. 5. In step S282, the terminal 15a receives a notice of update of the buddy list 60 from the buddy controller 21.

In step S322, the terminal 15b transmits a request for obtaining the personal information 80 of the user of the terminal 15a to the personal information controller 22 of the IM server 12. In step S304, the personal information controller 22 receives the request from the terminal 15b. Since the terminal 15a is "approaching" the terminal 15b (the Ask 63 of the buddy list 60 of the terminal 15a is "Subscribe"), the personal information controller 22 performs steps S84, S85, and S86 of FIG. 14, so as to set the disclosure level of the terminal 15b to the terminal 15a to "ROSTER". Accordingly, in step S305, the personal information controller 22 transmits the item(s) 81 and the value(s) 83 of the personal information 80 in which the access level 82 is set to "public" or "roster". In step S323, the terminal 15b receives the personal information of the user of the terminal 15a from the personal information controller 22. That is, the window 92 shown in FIG. 22 is displayed in the terminal 15b.

Figure 27:
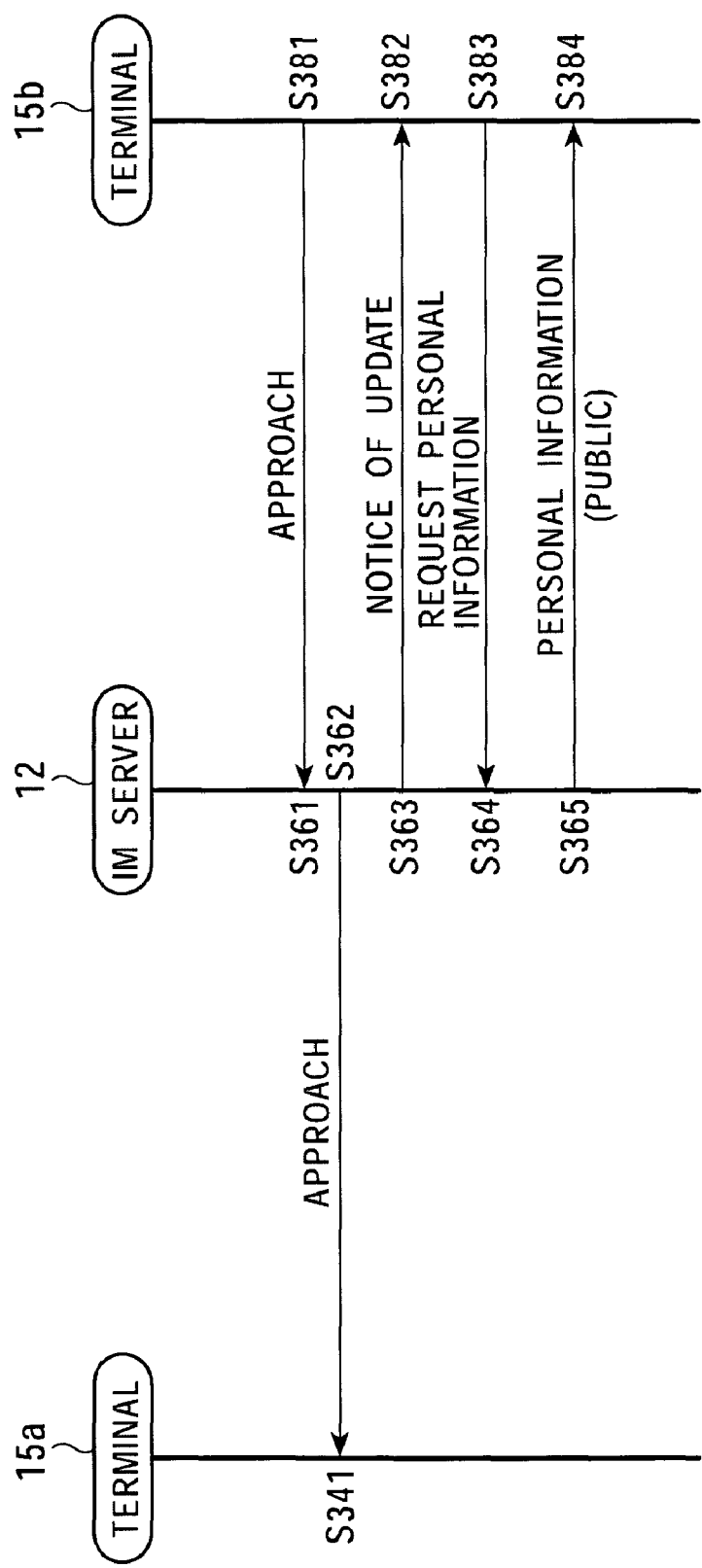
FIG. 27 illustrates an operation of the IM system when an "approach" is transmitted.

On the other hand, FIG. 27 shows an operation of requesting the personal information 80 of the user of the 15a, the request being performed by the terminal 15b which has transmitted an "approach" to the terminal 15a. In step S381, the terminal 15b transmits an "approach" to the terminal 15a to the buddy controller 21 of the IM server 12. In step S361, the buddy controller 21 receives the "approach" to the terminal 15a from the terminal 15b. In step S362, the buddy controller 21 transmits the "approach" from the terminal 15b to the terminal 15a. In step S341, the terminal 15a receives the "approach" from the terminal 15b from the buddy controller 21.

In step S363, the buddy controller 21 updates the buddy list 60 of the terminal 15b and notifies the terminal 15b of the update. At this time, the buddy controller 21 changes the buddy list 60 of the terminal 15b from the state shown in FIG. 7 to the state shown in FIG. 8. In step S382, the terminal 15b receives a notice of update of the buddy list 60 from the buddy controller 21. In step S383, the terminal 15b transmits a request for obtaining the personal information 80 of the user of the terminal 15a. In step S364, the personal information controller 22 of the IM server 12 receives the request from the terminal 15b.

Since the terminal 15a (requested terminal) is not "approaching" the terminal 15b, the personal information controller 22 performs a "No" of step S85 in FIG. 14, so that the disclosure level of the terminal 15b is set to "PUBLIC" (step S81). Therefore, in step S365, the personal information controller 22 transmits the item(s) 81 and the value(s) 83 of the personal information 80 of the terminal 15a in which the access level 82 is set to "public" to the terminal 15b. In step S384, the terminal 15b receives the personal information 80 of the user of the terminal 15a from the personal information controller 22. That is, the window 92 shown in FIG. 25 is displayed in the terminal 15b.

As described above, in the present invention, when a terminal receives an "approach" from another terminal, personal information in which the access level 82 is set to "public" or "roster" can be displayed. Therefore, the user can know personal information of a user who has approached, and can easily determine whether or not he/she accepts the "approach". Also, when the user transmits an "approach", personal information in which the access level 82 is set to "public" is displayed. Therefore, details of personal information of a user cannot be seen by a user at the other end when the user transmits an "approach", and thus privacy can be protected.

The operations of the terminals 15a and 15b have been described above. The other terminals operate in the same way.

A series of above-described processes can be executed by hardware or software. When the series of processes are executed by software, a program forming the software is installed into a general-purpose computer or the like.

Figure 28:
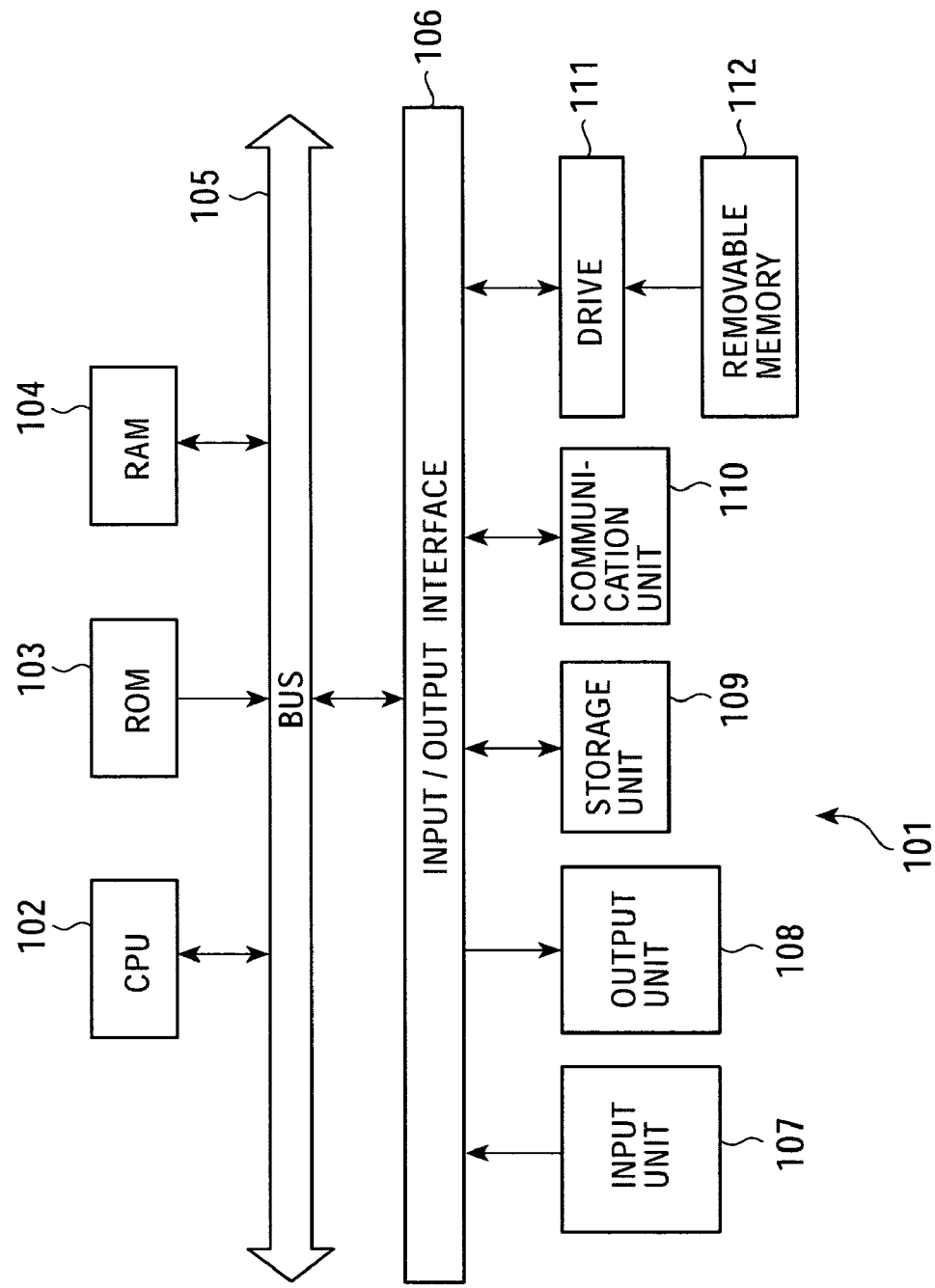
FIG. 28 is a block diagram showing a configuration of a personal computer according to an embodiment of the present invention.

FIG. 28 shows an example of the configuration of a personal computer 101 according to an embodiment, the program for executing the series of processes being installed therein.

The personal computer 101 includes a central processing unit (CPU) 102. An input/output interface 106 is connected to the CPU 102 through a bus 105. A read only memory (ROM) 103 and a random access memory (RAM) 104 are connected to the bus 105.

An input unit 107, including input devices such as a keyboard, a mouse, a scanner, and a microphone, operated by a user; and an output unit 108, including output devices such as a display, a speaker, a printer, and a plotter, are connected to the input/output interface 106. Also, a storage unit 109 including a hard disk drive for storing a program and various data; and a communication unit 110 for transmitting/receiving data through a network including the Internet are connected to the input/output interface 106.

Further, a drive 111 for reading/writing data from/on a recording medium such as a removable memory 112 is connected to the input/output interface 106 as required.

An information providing program for allowing the personal computer 101 to execute an operation of an information providing apparatus to which the present invention is applied is stored in the removable memory 112 and is supplied to the personal computer 101. Then, the program is read by the drive 111 and is installed in the hard disk drive included in the storage unit 109. The information providing program installed in the storage unit 109 is loaded from the storage unit 109 onto the RAM 104 in accordance with a command of the CPU 102, which corresponds to a user's command input through the input unit 107, so that the program is executed.

As shown in FIG. 28, the recording medium includes a package medium, such as the removable memory 112 containing a program, the package medium being separated from the apparatus and being distributed for providing a user with the program. In addition, the recording medium includes the ROM 103 containing the program and a hard disk included in the storage unit 109, provided such that the ROM 103 and the hard disk is incorporated in the main body of the apparatus.

In the specification, processes describing the program for allowing the computer to execute various processes are not necessarily performed in time series according to the order of the flowchart. The processes may be performed in parallel or independently (for example, parallel process and process by object are included).

As described above, according to the present invention, information can be provided. Also, item(s) of the information to be provided can be selected in accordance with the level of the user who requests information. Further, the level of the user of the requesting terminal can be changed in accordance with the relationship with the user of the requested terminal and the user of the requesting terminal. Also, information can be safely and easily provided.

What is claimed is:

1. An information providing apparatus for providing information of a registered first user to a second user, the apparatus comprising:

storage means for storing relationship information which defines a relationship between the first user and the second user;

setting means for setting a disclosure level as an access level to the information of the first user of the second user, who has transmitted the request received by the receiving means, to any of a first level for permitting access to all items of the information, a second level for permitting access to fewer items of the information than in the first level, and a third level for permitting access to fewer items of the information than in the second level, based on the relationship information stored in the storage means, said setting means changing the disclosure level from the third level to the second level for the second user with respect to the information of the first user when the first user sends a request to the second user, the request being a request for establishment of a predefined specific relationship to the second user;

receiving means for receiving a request for obtaining the information of the first user, the request being transmitted from an information processor of the second user after the first user sends the request for establishment of the predefined specific relationship to the second user;

selecting means for selecting items to be disclosed to the second user from the information of the registered first user based on the disclosure level of the second user set by the setting means; and transmitting means for transmitting the items selected by the selecting means to the information processor of the second user to allow the second user to decide whether or not to grant the request for establishment of the predefined specific relationship sent by the first user.

2. An apparatus according to claim 1, wherein the setting means sets the disclosure level to the second level when the specific relationship between the first and second users is established.

3. An apparatus according to claim 2, wherein the setting means sets the disclosure level to the third level when the first user does not request establishment of the specific relationship to the second user or when the specific relationship between the first and second users is not established.

4. An apparatus according to claim 1, wherein the setting means sets the disclosure level to the first level when the first user is the second user.

5. An information providing method performed by an information providing apparatus for providing information of a registered first user to a second user, the method comprising: storing relationship information which defines a relationship between the first user and the second user;

setting a disclosure level as an access level to the information of the first user of the second user, who has transmitted the request received in the receiving, to any of a first level for permitting access to all items of the information, a second level for permitting access to fewer items of the information than in the first level, and a third level for permitting access to fewer items of the information than in the second level, based on the relationship information stored in the storing;

changing the disclosure level from the third level to the second level for the second user with respect to the information of the first user when the first user sends a request to the second user, the request being a request for establishment of a predefined specific relationship to the second user;

receiving a request for obtaining the information of the first user, the request being transmitted from an information processor of the second user after the first user sends the request for establishment of the predefined specific relationship to the second user;

selecting items to be disclosed to the second user from the information of the registered first user based on the disclosure level of the second user set in the setting; and transmitting the items selected in the selecting to the information processor of the second user to allow the second user to decide whether or not to grant the request for establishment of the predefined specific relationship sent by the first user.

6. A non-transitory computer readable medium including computer executable instructions, wherein the instructions, when executed by a processor, cause the processor to perform a method comprising:

setting a disclosure level as an access level to the information of the first user of the second user, who has transmitted the request received in the receiving, to any of a first level for permitting access to all items of the information, a second level for permitting access to fewer items of the information than in the first level, and a third level for permitting access to fewer items of the information than in the second level, based on stored relationship information which defines a relationship between the first user and the second user;

changing the disclosure level from the third level to the second level for the second user with respect to the information of the first user when the first user sends a request to the second user, the request being a request for establishment of a predefined specific relationship to the second user;

receiving a request for obtaining the information of the first user, the request being transmitted from an information processor of the second user after the first user sends the request for establishment of the predefined specific relationship to the second user;

selecting items to be disclosed to the second user from the information of the registered first user based on the disclosure level of the second user set in the setting; and transmitting the items selected in the selecting to the information processor of the second user to allow the second user to decide whether or not to grant the request for establishment of the predefined specific relationship sent by the first user.

7. An information providing apparatus for providing information of a registered first user to a second user, the apparatus comprising:

a storage unit configured to store relationship information which defines a relationship between the first user and the second user;

a setting unit, including a processor and a memory, configured to set a disclosure level as an access level to the information of the first user of the second user, who has transmitted the request received by the receiver, to any of a first level for permitting access to all items of the information, a second level for permitting access to fewer items of the information than in the first level, and a third level for permitting access to fewer items of the information than in the second level, based on the relationship information stored in the storage unit, said setting unit configured to change the disclosure level from the third level to the second level for the second user with respect to the information of the first user when the first user sends a request to the second user, the request being a request for establishment of a predefined specific relationship to the second user;

a receiver configured to receive a request for obtaining the information of the first user, the request being transmitted from an information processor of the second user after the first user sends the request for establishment of the predefined specific relationship to the second user;

a selection unit configured to select items to be disclosed to the second user from the information of the registered first user based on the disclosure level of the second user set by the setting unit; and a transmitter configured to transmit the items selected by the selection unit to the information processor of the second user to allow the second user to decide whether or not to grant the request for establishment of the predefined specific relationship sent by the first user.

8. An apparatus according to claim 7, wherein the setting unit is configured to set the disclosure level to the second level when the specific relationship between the first and second users is established.

9. An apparatus according to claim 8, wherein the setting unit is configured to set the disclosure level to the third level when the first user does not request establishment of the specific relationship to the second user or when the specific relationship between the first and second users is not established.

10. An apparatus according to claim 7, wherein the setting unit is configured to set the disclosure level to the first level when the first user is the second user.

* * * * *